United States Patent
Katayama et al.

(10) Patent No.: US 7,974,872 B2
(45) Date of Patent: Jul. 5, 2011

(54) SYSTEM AND METHOD FOR ASSISTING CONSIDERATION OF SELECTION INCLUDING OBTAINING DEGREE-OF-NECESSITY OF A QUESTION FROM ANSWER DATA

(76) Inventors: Toshio Katayama, Tokyo (JP); Tsukasa Makita, Saitama (JP)

( * ) Notice: Subject to any disclaimer, the term of this patent is extended or adjusted under 35 U.S.C. 154(b) by 2068 days.

(21) Appl. No.: 10/200,134

(22) Filed: Jul. 23, 2002

(65) Prior Publication Data

US 2003/0070180 A1 Apr. 10, 2003

(30) Foreign Application Priority Data

Sep. 28, 2001 (JP) .................................. 2001-300621

(51) Int. Cl.
*G06F 17/60* (2006.01)
(52) U.S. Cl. .......................................................... 705/10
(58) Field of Classification Search ...................... 705/10
See application file for complete search history.

(56) References Cited

U.S. PATENT DOCUMENTS

| | | | | | |
|---|---|---|---|---|---|
| 5,517,405 | A | * | 5/1996 | McAndrew et al. | 706/45 |
| 5,754,939 | A | * | 5/1998 | Herz et al. | 455/3.04 |
| 5,835,900 | A | * | 11/1998 | Fagg et al. | 706/11 |
| 6,012,053 | A | * | 1/2000 | Pant et al. | 707/3 |
| 6,029,195 | A | * | 2/2000 | Herz | 725/116 |
| 6,035,283 | A | * | 3/2000 | Rofrano | 705/27 |
| 6,070,149 | A | * | 5/2000 | Tavor et al. | 705/26 |
| 6,397,212 | B1 | * | 5/2002 | Biffar | 707/704 |
| 6,412,012 | B1 | * | 6/2002 | Bieganski et al. | 709/232 |
| 6,460,036 | B1 | * | 10/2002 | Herz | 707/748 |
| 6,463,431 | B1 | * | 10/2002 | Schmitt | 1/1 |
| 6,609,108 | B1 | * | 8/2003 | Pulliam et al. | 705/27 |
| 6,631,362 | B1 | * | 10/2003 | Ullman et al. | 706/60 |
| 6,687,685 | B1 | * | 2/2004 | Sadeghi et al. | 706/15 |
| 6,728,706 | B2 | * | 4/2004 | Aggarwal et al. | 1/1 |
| 6,801,909 | B2 | * | 10/2004 | Delgado et al. | 707/4 |
| 6,826,541 | B1 | * | 11/2004 | Johnston et al. | 705/36 R |

(Continued)

FOREIGN PATENT DOCUMENTS

JP 5-101107 4/1993

(Continued)

OTHER PUBLICATIONS

Trajovic et al., U.S. Appl. No. 09/718,261, filed Nov. 22, 2000 Incorporated by reference into Buzak, USPN 6,922,680.*

(Continued)

*Primary Examiner* — Scott L Jarrett
(74) *Attorney, Agent, or Firm* — McGinn Intellectual Property Law Group, PLLC

(57) ABSTRACT

A system (and method) assists consideration of selection that recommends selection candidates to a considerer who is considering selection in a certain field in order to assist determination of selection with which the considerer is satisfied. A question concerning the field is sent to a considerer and answer data is received from the considerer by the system. A degree-of-significance of each evaluation item in the field is estimated from the answer data. A degree-of-recommendation representing to which degree each selection candidate can be recommended to the considerer is calculated from evaluation data for each evaluation item with respect to each piece of selection candidate data in the field and the degree-of-significance of the considerer with respect to each evaluation item. Then, degrees of recommendation of selection candidate data in the field are presented to the considerer without change or after processing the data.

17 Claims, 17 Drawing Sheets

U.S. PATENT DOCUMENTS

| | | | |
|---|---|---|---|
| 6,922,680 B2* | 7/2005 | Buczak | 706/15 |
| 7,080,071 B2* | 7/2006 | Henrion et al. | 707/6 |
| 7,231,419 B1* | 6/2007 | Gheorghe et al. | 709/203 |
| 7,343,328 B1* | 3/2008 | Smith et al. | 705/27 |
| 7,380,262 B2* | 5/2008 | Wang et al. | 725/46 |
| 2002/0029154 A1* | 3/2002 | Majoor | 705/1 |
| 2002/0065721 A1* | 5/2002 | Lema et al. | 705/14 |
| 2002/0095329 A1* | 7/2002 | Malik et al. | 705/10 |
| 2002/0147619 A1* | 10/2002 | Floss et al. | 705/5 |
| 2003/0036930 A1* | 2/2003 | Matos et al. | 705/5 |
| 2003/0078900 A1* | 4/2003 | Dool | 706/18 |
| 2003/0182413 A1* | 9/2003 | Allen et al. | 709/223 |
| 2004/0059626 A1* | 3/2004 | Smallwood | 705/10 |
| 2004/0267607 A1* | 12/2004 | Maddux | 705/11 |

FOREIGN PATENT DOCUMENTS

| | | |
|---|---|---|
| JP | 9-204445 | 8/1997 |
| JP | 9-245085 | 9/1997 |
| JP | 10-243309 | 9/1998 |
| JP | 10-254911 | 9/1998 |
| JP | 2000-137615 | 5/2000 |
| JP | 2002-123547 | 4/2002 |

OTHER PUBLICATIONS

Schafer, Recommender Systems in E-Commerce 1$^{st}$ ACM Conference on E-Commerce, 1999.*

Burke, Robin, Knowledge-based recommender systems Encyclopedia of Library Information Systems, vol. 69, No. 32, 2000.*

Chiclana F. et al., Multiperson Decision Making Based on Multiplicative Preference Relations DECASI, Technical Report DECASI-98118. Jun. 1998.*

Beyond.com Launches Gifts Tab for Easy Holiday Shopping Business Editors, Oct. 18, 1999.*

Ask Jeeves Unveils Shopping Advisor to Assist Online Businesses in E-Commerce Initiatives Business Wire, Oct. 11, 1999.*

Japan Economic Journal, Aug. 26, 2000, Morning Edition (Plus 1) p. 14S.

Sentaku (Gnutella), Aug. 2000, pp. 98-99.

SmartWoman (web page: http://smartwoman.nikkei.co.jp/index.cfm, Jul. 9, 2002 (5 pages total).

Sentaku (Gnutella), "Gnutella Emerged After Napster", Aug. 2000, pp. 98-99.

SmartWoman (web page: http://smartwoman,nikkei.co.jp/index.cfm), "Portfolio Tester", Jul. 9, 2002, 5 Pages Total.

* cited by examiner

FIG.15

| QUESTION | QID | TYPE OF QUESTION *1 | A: OPTION | D: ANSWER DATA CORRESPONDING TO EACH OPTION |
|---|---|---|---|---|
| ⋮ | ⋯⋯ | ⋮ | ⋮ | ⋮ |
| ⋮ | ⋯⋯ | ⋮ | ⋮ | ⋮ |
| EXPERIENCE OF OVERSEAS TRAVEL | 030009 | $T_{1111}$ | A1: NONE | D1: 0. 0 |
| | | | A2: ONCE OR TWICE | D2: 0. 5 |
| | | | A3: THREE TO SIX TIMES | D3: 0. 7 |
| | | | A4: SEVEN TO TEN TIMES | D4: 0. 9 |
| | | | A5: MORE THAN TEN TIMES | D5: 1. 0 |
| REGION YOU WOULD LIKE TO VISIT *2 | 030010 | $T_{0111}$ | A1: ASIA | DA: 0. 3; DB: 1. 0 |
| | | | A2: EUROPE | DA: 1. 0; DB: 0. 9 |
| | | | A3: NORTH AMERICA | DA: 0. 9; DB: 0. 5 |
| | | | A4: SOUTH AMERICA | DA: 0. 5; DB: 0. 3 |
| | | | A5: OCEAN | DA: 0. 7; DB: 0. 1 |
| | | | A6: AFRICA | DA: 0. 1; DB: 0. 3 |
| ⋮ | 030011 | ⋮ | ⋮ | ⋮ |
| DO YOU ATTACH SIGNIFICANCE TO COSTS? | 030012 | $T_{1111}$ | A1: VERY MUCH | 1. 0 |
| | | | A2: FAIR | 0. 7 |
| | | | A3: NOT SO MUCH | 0. 3 |
| | | | A4: NOT AT ALL | 0. 0 |
| DO YOU HAVE STRONG PREFERENCE FOR FOODS? | 030013 | $T_{0011}$ | A1: VERY STRONG | 1. 0 |
| | | | A2: FAIRLY STRONG | 0. 7 |
| | | | A3: NOT SO STRONG | 0. 3 |
| | | | A4: NOT STRONG AT ALL | 0. 0 |
| ⋮ | ⋮ | ⋮ | ⋮ | ⋮ |
| ⋮ | ⋮ | ⋮ | ⋮ | ⋮ |

*1 TYPE: FOR WHICH OF TYPES I TO IV QUESTION IS ASKED
*2: FOR CONVENIENCE OF DATA ANALYSIS, IT IS POSSIBLE THAT A PLURALITY OF PIECES OF ANSWER DATA IS DERIVED FROM ONE ANSWER

FIG. 16

| QUESTIONS FOR CLASSIFYING USER INTO FOUR CATEGORIES | TYPE | FOR WHICH TYPE QUESTION IS ASKED | | | |
|---|---|---|---|---|---|
| | | KNOW WELL | | DO NOT KNOW SO WELL | |
| | | REFERENCE | ATTACH SIGNIFICANCE TO RECOMMENDATION | REFERENCE | ATTACH SIGNIFICANCE TO RECOMMENDATION |
| HOW MANY TIMES DO YOU EXPERIENCED OVERSEAS TRAVEL? | $T_{1111}$ | O | O | O | O |
| WHICH DO YOU PREFER, PLACE WHERE YOU VISIT FOR THE FIRST TIME OR HAVE VISITED SEVERAL TIMES? | $T_{0101}$ | | O | | O |
| WHAT DO YOU WANT FROM OVERSEAS TRAVEL? | $T_{0011}$ | | | O | O |
| WHICH POINT OF OVERSEAS TRAVEL DO YOU LIKE? | $T_{1100}$ | O | O | | |
| DO YOU LIKE DRIVING A CAR? | $T_{1010}$ | O | | O | |
| DO YOU WANT TO DRIVE A CAR OVERSEAS? | $T_{1100}$ | O | O | | |
| WHAT ARE YOU INTERESTED IN YOUR DAILY LIFE? | $T_{0011}$ | | | O | O |
| WHICH PLACE HAVE YOU EVER VISITED ON YOUR DOMESTIC TRAVEL? | $T_{0111}$ | | O | O | O |
| HOW DO YOU EVALUATE YOUR OWN CHARACTERISTIC? | $T_{1010}$ | O | | O | |
| WHICH POINTS OF OTHERS DO YOU FEEL UNCOMFORTABLE WITH? | $T_{0111}$ | | O | O | O |
| WHAT DID YOU FEEL UNPLEASANT ABOUT DURING YOUR OVERSEAS TRAVEL? | $T_{1100}$ | O | O | | |
| TO WHICH DEGREE ARE YOU SATISFIED WITH DAILY LIFE? | $T_{0011}$ | | | O | O |
| RELATION WITH A PERSON WHO YOU TRAVEL WITH | $T_{0011}$ | | | O | O |
| WHICH COUNTRY DO YOU WANT TO VISIT? | $T_{1100}$ | O | O | | |
| WHICH TYPE OF REGION DO YOU PREFER ("CULTURAL AND CLEAN", "COARSE BUT LIVELY", "HISTORICALLY IMPORTANT" etc.)? | $T_{0011}$ | | | O | O |
| WHAT KIND OF CLIMATE OF REGION DO YOU LIKE? | $T_{0011}$ | | | O | O |
| DO YOU HAVE STRONG LIKES OR DISLIKES OF FOODS? | $T_{0011}$ | | | O | O |
| DO YOU LIKE THEATRICALS OR THE LIKE? | $T_{1010}$ | O | | O | |
| WHAT WOULD YOU LIKE TO BUY? | $T_{1010}$ | O | | O | |
| WHICH DO YOU LIKE BETTER, OUTDOOR OR INDOOR? | $T_{0011}$ | | | O | O |

THE NUMBER OF WAYS FOR MARKING BY CIRCLE, THAT IS, KINDS OF TYPES IS $2^4 - 1$ (15)

FIG. 17

| PRE-QUESTION/ OPTION ＼ POINT FOR NECESSITY OF MAIN QUESTION | PRE-QUESTION n0 (CONSIDERER FOUR CLASSIFICATION) | | | | PRE-QUESTION n1 (SELECT ONE OUT OF THREE) | | | PRE-QUESTION n2 (SELECT ONE OUT OF FOUR) | | | | | POINT OF N WHEN ANSWER IS "1" FOR n0, "2" FOR n1 AND "3" FOR n2 |
|---|---|---|---|---|---|---|---|---|---|---|---|---|---|
| | n01 | n02 | n03 | n04 | n11 | n12 | n13 | n21 | n22 | n23 | n24 | | |
| POINT CORRESPONDING TO QUESTION CONCERNING DESTINATION | n01 (DESTINATION) | n02 (DESTINATION) | n03 (DESTINATION) | n04 (DESTINATION) | n11 (DESTINATION) | n12 (DESTINATION) | n13 (DESTINATION) | n21 (DESTINATION) | n22 (DESTINATION) | n23 (DESTINATION) | n24 (DESTINATION) | ...... | N (DESTINATION) = n01 (DESTINATION) + n13 (DESTINATION) + n23 (DESTINATION) + .... |
| POINT CORRESPONDING TO QUESTION CONCERNING ITINERARY | n01 (ITINERARY) | n02 (ITINERARY) | n03 (ITINERARY) | n04 (ITINERARY) | n11 (ITINERARY) | n12 (ITINERARY) | n13 (ITINERARY) | n21 (ITINERARY) | n22 (ITINERARY) | n23 (ITINERARY) | n24 (ITINERARY) | ...... | N (ITINERARY) = n01 (ITINERARY) + n13 (ITINERARY) + n23 (ITINERARY) + .... |
| ...... | ...... | ...... | ...... | ...... | ...... | ...... | ...... | ...... | ...... | ...... | ...... | ...... | ...... |

FIG.18

| COMMODITY SELECTION CANDIDATE (Cj) \ EVALUATION ITEM | Im (COSTS) | | | | Is (SAFETY) | | | | If (LOCAL MEAL) | | | | Ia (LOCAL MEANS OF TRANSPORTATION) | | | |
|---|---|---|---|---|---|---|---|---|---|---|---|---|---|---|---|---|
| | sp | su | au | wi | sp | su | au | wi | sp | su | au | wi | sp | su | au | wi |
| C1 (THE CARIBBEAN) | $E_{1m}(sp)$ | $E_{1m}(su)$ | $E_{1m}(au)$ | $E_{1m}(wi)$ | $E_{1s}(sp)$ | ⋮ | ⋮ | ⋮ | | | | | | | | |
| C2 (MONACO) | $E_{2m}(sp)$ | $E_{2m}(su)$ | $E_{2m}(au)$ | $E_{2m}(wi)$ | $E_{2s}(sp)$ | ⋮ | ⋮ | ⋮ | | | | | | | | |
| C3 (NICE) | $E_{3m}(sp)$ | $E_{3m}(su)$ | $E_{3m}(au)$ | $E_{3m}(wi)$ | $E_{3s}(sp)$ | ⋮ | ⋮ | ⋮ | | | | | | | | |
| C4 (HONG KONG) | $E_{4m}(sp)$ | $E_{4m}(su)$ | $E_{4m}(au)$ | $E_{4m}(wi)$ | $E_{4s}(sp)$ | ⋮ | ⋮ | ⋮ | | | | | | | | |
| C5 (PARIS) | $E_{5m}(sp)$ | $E_{5m}(su)$ | $E_{5m}(au)$ | $E_{5m}(wi)$ | $E_{5s}(sp)$ | ⋮ | ⋮ | ⋮ | | | | | | | | |
| ...... | ...... | | | | ...... | | | | | | | | | | | |

| | Iv (SCENERY) | | | | Ise (DEGREE OF ATTRACTIVENESS OF SEASONS) | | | |
|---|---|---|---|---|---|---|---|---|
| | sp | su | au | wi | sp | su | au | wi |
| | | | | ⋯⋯ | 0.2 | 0.7 | 0.1 | 0 |
| | | | | ⋯⋯ | | | | ⋯⋯ |

FIG.19

| EVALUATION ITEM OF OVERSEAS TRAVEL | COSTS (m) | SAFETY (s) | LOCAL MEAL (f) | LOCAL MEANS OF TRANSPORTATION (a) | SCENERY (v) | DEGREE OF SIGNIFICANCE OF SEASONS/ATTRACTIVENESS OF EACH SEASON | | | | ... | TOTAL EVALUATION |
|---|---|---|---|---|---|---|---|---|---|---|---|
| | | | | | | SPRING | SUMMER | AUTUMN | WINTER | | |
| DEGREE OF SIGNIFICANCE OF CONSIDERER MR X FOR EACH ITEM | $P_m$ | $P_s$ | $P_f$ | $P_a$ | $P_v$ | $P_{sp}$ =0.25 | $P_{su}$ =0.25 | $P_{au}$ =0.25 | $P_w$ =0.25 | ... | — |
| EVALUATION OF DESTINATION OF TRAVEL j | $E_{jm}$ | $E_{js}$ | $E_{jf}$ | $E_{ja}$ | $E_{jv}$ | sp 0.2 | su 0.7 | au 0.1 | wi 0 | ... | — |
| DEGREE OF SIGNIFICANCE OF MR X × $E_j$ | 0.7 | 1 | 1 | 0.5 | 1 | | 0.25 | | | ... | SECOND RANK |
| EVALUATION OF DESTINATION OF TRAVEL j' | $E_{j'm}$ | $E_{j's}$ | $E_{j'f}$ | $E_{j'a}$ | $E_{j'v}$ | sp 0.1 | su 0.3 | au 0.4 | wi 0.2 | ... | — |
| DEGREE OF SIGNIFICANCE OF MR X × $E_j$ | 1.5 | 1 | 1 | 0.5 | 1 | | 0.25 | | | ... | FIRST RANK |

FIG.20

| EVALUATION ITEM OF OVERSEAS TRAVEL | COSTS (m) | SAFETY (s) | LOCAL MEAL (f) | LOCAL MEANS OF TRANSPORTATION (a) | SCENERY (v) | DEGREE OF SIGNIFICANCE OF SEASONS (SUMMER) | ... | TOTAL EVALUATION |
|---|---|---|---|---|---|---|---|---|
| DEGREE OF SIGNIFICANCE OF CONSIDERER MR X FOR EACH ITEM | $P_m$ | $P_s$ | $P_f$ | $P_a$ | $P_v$ | $P_{su}=1$ | ... | — |
| EVALUATION OF DESTINATION OF TRAVEL j | $E_{jm}(su)$ | $E_{js}$ | $E_{jf}(su)$ | $E_{ja}$ | $E_{jv}(su)$ | su | ... | — |
| DEGREE OF SIGNIFICANCE OF MR X × E | 0.3 | 1 | 0.8 | 0.5 | 1.2 | 0.7 | ... | FIRST RANK |
| EVALUATION OF DESTINATION OF TRAVEL j' | $E_{j'm}(su)$ | $E_{j's}$ | $E_{j'f}(su)$ | $E_{j'f}$ | $E_{j'v}(su)$ | su | ... | — |
| DEGREE OF SIGNIFICANCE OF MR X × $E_{j'}$ | 0.5 | 1 | 0.6 | 0.5 | 1.0 | 0.3 | ... | SECOND RANK |

FIG.21

| | AUTOMOBILE (1) | FASHION (2) | INTERIOR (3) | MOVIE (4) | | | | | | |
|---|---|---|---|---|---|---|---|---|---|---|
| CLEANNESS (1) | $a_{11}$ | $a_{12}$ | $a_{13}$ | $a_{14}$ | | | | | | |
| CHARACTERISTIC (2) | $a_{21}$ | $a_{22}$ | $a_{23}$ | ⋯ | | | | | | |
| CALMNESS/PEACEFULNESS (3) | $a_{31}$ | $a_{32}$ | ⋯ | | | | | | | |
| SELF-ASSERTION (4) | $a_{41}$ | ⋯ | | | | | | | | |
| BRIGHTNESS/ACTIVE (5) | $a_{51}$ | | | | | | | | | |
| BRAND/DIGNITY (6) | ⋯ | | | | | | | | | |
| SHARPNESS (7) | | | | | | | | | | |
| ENJOYMENT WITH LOVER/SPOUSE (8) | | | | | | | | | | |
| ENJOYMENT OF FAMILY (9) | | | | | | | | | | |
| ⋯ | | | | | | | | | | |

FIG.22

| SELECTION CANDIDATE | I | II | III | IV | V |
|---|---|---|---|---|---|
| DEGREE OF RECOMMENDATION FOR CONSIDERER A | 33 | 28 | 25 | 15 | 15 |
| DEGREE OF RECOMMENDATION FOR CONSIDERER B | 33 | 31 | 26 | 18 | 14 |
| DEGREE OF RECOMMENDATION FOR CONSIDERER C | 38 | 41 | 49 | 59 | 63 |
| DEGREE OF RECOMMENDATION FOR CONSIDERER D | 39 | 39 | 38 | 36 | 34 |
| AVERAGE DEGREE OF RECOMMENDATION | 35.8 | 33.8 | 33.5 | 32.0 | 31.5 |
| ORDER OF RECOMMENDATION | 1 | 2 | 3 | 4 | 5 |

FIG.23

| SELECTION CANDIDATE | I | II | III | IV | V |
|---|---|---|---|---|---|
| DEGREE OF RECOMMENDATION FOR CONSIDERER A (1) | 33 | 28 | 25 | 15 | 15 |
| DEGREE OF RECOMMENDATION FOR CONSIDERER B (1) | 33 | 31 | 26 | 18 | 14 |
| DEGREE OF RECOMMENDATION FOR CONSIDERER C (4) | 38 | 41 | 49 | 59 | 63 |
| DEGREE OF RECOMMENDATION FOR CONSIDERER D (3) | 39 | 39 | 38 | 36 | 34 |
| WEIGHTED AVERAGE = DEGREE OF RECOMMENDATION | 37.2 | 37.8 | 40.1 | 41.9 | 42.6 |
| ORDER OF RECOMMENDATION | 5 | 4 | 3 | 2 | 1 |

NUMBER IN PARENTHESES INDICATES A DEGREE OF CONCERN/INTEREST WITH RESPECT TO THE FIELD UNDER CONSIDERATION: WEIGHTED AVERAGE IS CALCULATED USING THIS NUMERICAL VALUE

FIG.24

| EVALUATION ITEM | DEGREE OF SIGNIFICANCE OF EACH CONSIDERER WITH RESPECT TO EACH EVALUATION ITEM | | WEIGHTED DEGREE OF SIGNIFICANCE | EVALUATION OF EACH SELECTION CANDIDATE IN EACH EVALUATION ITEM | | | | |
|---|---|---|---|---|---|---|---|---|
| | | | | I | II | III | IV | V |
| α | A | 2 | 7 | 10 | 7 | | | |
| | B | 1 | | | | | | |
| | C | 1 | | | | | | |
| | D | 1 | | | | | | |
| β | A | 1 | 20 | 3 | 4 | 6 | 1 | 2 |
| | B | 1 | | | | | | |
| | C | 6 | | | | | | |
| | D | 3 | | | | | | |
| γ | A | 1 | 9 | 10 | 10 | 7 | 4 | 1 |
| | B | 2 | | | | | | |
| | C | 1 | | | | | | |
| | D | 2 | | | | | | |
| TOTAL DEGREE OF RECOMMENDATION | | | | 220 | 219 | 225 | 223 | 223 |
| ORDER OF RECOMMENDATION | | | | 4 | 5 | 1 | 2 | 2 |

SYSTEM AND METHOD FOR ASSISTING CONSIDERATION OF SELECTION INCLUDING OBTAINING DEGREE-OF-NECESSITY OF A QUESTION FROM ANSWER DATA

BACKGROUND OF THE INVENTION

1. Field of the Invention

The present invention relates to a system for assisting decision-making utilizing an apparatus, such as a computer or a game machine for home use, that is capable of carrying out high-speed calculation and has a storage device for storing data (hereinafter simply referred to as a calculating unit), and more particularly, to a system for assisting consideration of selection that is capable of taking into account items, to which a considerer who is considering selecting at least one candidate out of selection candidates in at least one field attaches significance in the field, in evaluating the selection candidates to present a selection candidate that should be most recommended to the considerer.

2. Description of the Related Art

As an example of a method of assisting decision-making, commodity (i.e., consumer goods and services) recommendations to consumers by printed media, such as an information magazine (for example, Consumer Reports, etc.), have been conventionally well known. For example, as it is found in an automobile magazine and a personal computer magazine, there is a type of printed media, in which recommended merchandizes that are ranked relatively higher according to evaluation criteria unique to the magazine, are extensively introduced. Otherwise, there is another type of printed media, in which readers are categorized according to several conditions and are introduced an optimal recommended merchandizes for each category.

However, on the premise that the printed media are used by general individuals, the printed media have physical limitation in showing information and can include about 1,000 pages at the most. Therefore, there are the following disadvantages.

(1) The number of merchandizes that can be introduced is limited and recommendation is possible only for new merchandizes or merchandizes that are much talked about.

(2) Limitation arises in categorization of consumers and consumers can be categorized only by perfunctory classes such as an age, an occupation and a purpose of purchase.

As a result, it is theoretically impossible in the first place to recommend an optimal commodity for each consumer.

In order to overcome such disadvantages, a system for recommending commodity using a computer has been proposed as described in Japanese Patent Laid-Open No. JP.97-204445A. According to the method described therein, an amount of information able to be treated is remarkably increased and a wide variety of personal data including history of purchases, characteristics and preferences of the consumer can be prepared. Thus, it becomes possible to perform commodity recommendation that matches more detailed categorization of considers.

However, since this method matches conditions or the like that a considerer wishes the commodity to have, with characteristics of each commodity in order to narrow down recommended commodity, the method is the same as a search engine on the Internet in that it retrieves information or documents including the information or sites where the information exists by way of narrowing down corresponding to presented conditions. Even if the conditions are defined precisely, a degree of significance given to each condition varies for each considerer. This point is not taken into account at all, because all the conditions are treated equally.

A search engine is a tool for retrieving information required by a considerer from a large amount of information on the Internet. However, the present situation is that "even if we try to narrow information by keywords, the narrowing down cannot be attained because information is collected too much" (Japan Economic Journal, Aug. 26, 2000, Morning edition (Plus 1) page 14S) and a limit to simple non-organic retrieval has begun to appear.

Moreover, currently, it is possible to retrieve and obtain information from a personal computer of a person who permits to provide the information, by software called Gnutella (see "Sentaku" August 2000, pages 99 to 99). In fact, roles that have been played by the search engine are the same as this Gnutella. The search engine simply shows where digital information satisfying a given condition exists but never determines how useful the information is for each considerer. It is obvious that this drawback also applies to the system described in Japanese Patent laid-Open No. JP.97-204445A that simply narrow information according to presented conditions.

In addition, recently there exists a web page (http://smart-woman.nikkei.co.jp/) for preparing an asset management portfolio by asking a user to provide information on an amount of their assets and a management attitude of the user.

However, even on this web page, a combination of optimal asset management methods is merely presented according to a result of answers to questions and it is not reflected on the result of answers how much significance a user attaches and to which item the user attaches significance, similarly to the method of the narrowing retrieval as described above.

As described above, the conventional recommendation method essentially has a limitation in that it cannot reflect a degree of significance that a searcher gives to desired conditions on a recommendation as in the method using the search engine. As an example specifically showing the limitation, a case in which an overseas travel is recommended will be described hereinbelow.

It is assumed as data that the sea (for example, ocean) is fairly clean, peace and order is fairly good and prices are fairly low in the Caribbean, the sea is very clean and peace and order is fairly good but prices are a little high in Greece and the sea is very clean but peace and order is bad and prices are very high in Indonesia.

When a consumer wishes to travel overseas to a destination where "the sea is clean, peace and order is good and prices are low", since destinations are categorized based on whether or not a destination matches conditions in the conventional method, only the Caribbean, which satisfies the above-mentioned three conditions, is recommended, whereas other destinations are not recommended. However, although this recommendation is appropriate if the consumer cares about the above-mentioned three conditions equally, it is quite doubtful that the recommendation is correct or not if the consumer does not care about the conditions equally.

For example, if the consumer attaches the most significance to the condition "the sea is clean" among the above-mentioned three conditions, it is likely that the recommendation of Greece is more appropriate than that of the Caribbean. However, the destinations other than the Caribbean are never recommended with the conventional method of picking up and recommending a commodity that matches the conditions (i.e., excluding commodity that does not match the conditions).

Namely, with the conventional recommendation method, a result of calculating a commodity evaluation by taking into account a degree of significance for a consumer given to each evaluation item is not presented. Thus, an option that better matches the consumer's needs may not be recommended.

Conventionally, if a consumer is not satisfied with a recommendation result in this way, the consumer must answer questions again in order to obtain another recommendation result. However, in this case, the consumer must estimate by oneself how the consumer should change answers to the questions in order to derive another recommendation result. In addition, even a retrieval result obtained by answering the questions again in this way still does not reflect a degree-of-significance for the consumer given to each answer item.

Moreover, with the conventional recommendation method, evaluation items such as "cleanness of the sea", "peace and order", "prices" and "convenience of transportation" are treated equally as unrelated to and independent from each other. However, for example, the items "peace and order" and "convenience of transportation" are not always unrelated. It is possible that an interrelation exists between both the items in that transportation becomes inconvenient if peace and order is bad and transportation becomes convenient it peace and order is good. In this way, since there are interrelations of various strengths among the evaluation items, it is difficult to conclude that all the evaluation items are completely independent. Therefore, if the evaluation items are evaluated as independent from and unrelated to each other, there arises a limitation in the accuracy of recommendation.

As described above, in hopes that a consumer vaguely cherishes a commodity a plurality of evaluation items may be inextricably linked and a recommendation may be inappropriate simply by summing evaluations. Conversely, if answers to a plurality of questions are obtained from a consumer, a true degree of significance held by the consumer with respect to a certain single evaluation item may be derived.

SUMMARY OF THE INVENTION

The present invention has been achieved in view of these problems, and it is an object of the present invention to provide a system for assisting consideration of selection and a program for assisting consideration of selection, that are capable of taking into account a degree-of-significance that is a degree each consumer has with respect to evaluation items, to assist a considerer, who is considering selection in at least one field, in determining selection with which the consider is satisfied.

As a result of having devoted themselves to research in order to solve such problems, the inventors have obtained an invention that (1) can reference enormous kinds of selection candidates, (2) determines a degree-of-significance for a considerer from answers of the considerer to questions and (3) finds a selection candidate that is most suitable for needs of the considerer including preference according to a degree-of-recommendation representing to which degree each selection candidate is recommended to the consider, the degree-of-recommendation being calculated with taking the degree-of-significance into account, by means of a calculating unit such as a computer, thereby attaining the initial object.

Moreover, the inventors have obtained an invention that, (4) if the considerer is not satisfied with the found selection candidate, specifies its cause to ask the considerer to answer again and (5) recalculates a degree-of-recommendation of the selection candidates according to re-answer, thereby attaining the initial object.

That is, a system for assisting consideration of selection according to the present invention is a system for asking a person, who is considering at least one selection among selection candidates in at least one field, questions concerning the field of consideration and utilizing answers to the questions to assist determination of selection of the considerer using a calculating unit having a storage device that can store data. The storage device stores at least one piece of selection candidate data in the field of consideration, at least one evaluation item, evaluation data for each evaluation item with respect to each piece of selection candidate data, and also at least one question concerning a field of consideration therein.

The system comprises a receiving unit for receiving at least one piece of answer data of the considerer to at least one question concerning the field of consideration, a degree-of-significance estimating unit for estimating how much degree-of-significance the considerer attaches to each evaluation item in the field of consideration from the answer data, and a degree-of-recommendation calculating unit for calculating to which degree each selection candidate can be recommended to the considerer from evaluation data for each evaluation item with respect to each piece of selection candidate data in the field of consideration stored in the storage device and a degree-of-significance of the considerer with respect to each evaluation item estimated by the degree-of-significance estimating unit.

The system receives answer data of the considerer to at least one question concerning a field of consideration, whereby it can be grasped which items the considerer thinks are important and which item the considerer does not think is very important among at least one evaluation item in the field directly or indirectly. Consequently, the system estimates a degree-of-significance for each evaluation item and calculates a degree-of-recommendation concerning each selection candidate from the estimated degree-o f-significance and evaluation data for evaluation items with respect to each piece of selection candidate data. In this way, since a degree-of-significance indicating how much significance a considerer attaches to each evaluation item is taken into account, it becomes possible to recommend a selection candidate that matches needs of the considerer better.

The system can be further provided with a presenting unit for presenting degrees of recommendation of all pieces of selection candidate data in the field of consideration and/or results of comparison of the degrees of recommendation without change or processing by specifying them according to a degree-of-recommendation and/or ranking or otherwise. The system displays only degrees of recommendation of selection candidate data and/or results of comparison more than a fixed degree-of-recommendation or presenting them in the order of degrees of recommendation, whereby a degree-o f-recommendation of each selection candidate can be shown to a considerer clearly. By the same token, a selection candidate having the highest degree-of-recommendation may be simply presented.

A degree-of-significance calculation function for calculating a degree-of-significance for each evaluation item from answer data of a considerer received by the receiving unit can be stored in the storage device. Since the degree-of-significance calculation function is stored in advance, various complicated degrees of significance calculations can be performed and various complicated forms of degrees of significance for a considerer with respect to each evaluation item can be grasped from various questions.

A question to a considerer may be a question for directly asking one certain degree-of-significance, or a question that can indirectly derive a degree-of-significance or the like. One degree-of-significance can be derived from answer data with respect to a plurality of questions or deriving a plurality of degrees of significance can be derived from answer data with respect to one question. In this way, a degree-of-significance is calculated using a degree-of-significance calculation function, whereby it becomes possible to calculate various complicated degrees of significance for a considerer.

A degree-of-recommendation calculation function for calculating a degree-of-recommendation of each selection candidate from evaluation data and a degree-of-significance for each evaluation item with respect to each piece of selection candidate data can be stored in the storage device.

The degree-of-recommendation calculation function may be a simple linear function of evaluation data and a degree-of-significance and, in addition, may be a logarithmical function, an exponential function, a power function, combinations of these functions and other arbitrary functions and terms related to a plurality of evaluation items may be multiplied instead of being added or may have a relation of a logarithmical function, an exponential function, a power function or the like. By storing such a degree-of-recommendation calculation function, more accurate calculation of a degree-of-recommendation can be performed based on various complicated degrees of significance with respect to each evaluation item.

As evaluation items, those that are not independent but have interrelationships or those that are not equally weighted can be used. In addition, even if a degree-of-recommendation changes complicatedly due to increase and decrease of a degree-of-significance, an accurate degree-of-recommendation can be calculated.

The system can be provided with a retrial processing unit, if a considerer is not satisfied with degrees of recommendation of selection candidates calculated by the degree-of-recommendation calculating unit and/or results of comparison of the degrees of recommendation, in order to specify causes of the dissatisfaction, extract questions attributable to the causes, receive re-answer data to the questions and recalculate a degree-of-significance and a degree-of-recommendation based on the re-answer data. Consequently, if the considerer is dissatisfied, recommendation of selection candidates with which the considerer is satisfied can be performed simply by re-answering only answer items that caused presentation of the selection candidates with which the considerer is dissatisfied instead of re-answering all answer items that has already been answered. Thus, a recommendation with which the considerer is satisfied can be performed.

The degree-of-significance estimating unit and the degree-of-recommendation calculating unit can calculate a degree-of-significance with respect to each evaluation item and a degree-of-recommendation with respect to each selection candidate each time answer data with respect to each question is received by the receiving unit. The system can present degrees of recommendation of all pieces of selection candidate data in a field of consideration to the considerer without change and/or after processing them each time answer data with respect to each question is received by the receiving unit.

The receiving unit can include a main question determining unit for receiving answer data with respect to first at least one question of a considerer, thereby determining whether to select a question suitable to the considerer as a subsequent question out of the at least one question stored in the storage device to receive answer data of the considerer with respect to the question or not to receive answer data from the considerer without selecting a subsequent question. Thus, considerers can be classified into several types according to answer data with respect to the first at least one question and the main question determining unit asks only a question suitable to the types, selected out of at least one question or does not ask any question assuming that there is no suitable question, whereby labor of the considerers can be reduced.

The degree-of-recommendation calculating unit may calculate a degree-of-recommendation for each combination of a plurality of selection candidate data in a single or a plurality of fields. In this case, the degree-of-significance estimating unit finds a degree-of-significance and/or the degree-of-recommendation calculating unit finds a degree-of-recommendation with algorithms that are adapted to recommendation of a combination of a plurality of pieces of selection candidate data and can be different from when a single selection candidate is recommended, whereby the degree-of-recommendation can be presented to the considerer for each combination of the plurality of pieces of selection candidate data without change and/or after processing.

Consequently, it is likely that a selection candidate that was recommended as one ranked top or equivalent to it when one selection candidate is recommended in a single field may not be included in a recommendation as one ranked top or equivalent to it in recommendation of a combination of a plurality of selection candidates. It is also likely that a selection candidate that was not recommended as one ranked top or equivalent to it when one selection candidate is recommended in a single field may be included in recommendation as one ranked top or equivalent to it in recommendation of a combination of a plurality of selection candidates. In addition, in recommendation of a combination of a plurality of selection candidates in a plurality of fields, it is likely that results of recommendation of a single or a plurality of combinations in each field are different from each other.

In addition, if a plurality of considerers are performing determination of selection of the same contents in a single or a plurality of fields, the degree-of-recommendation calculating unit may calculate a degree-of-recommendation of all selection candidates for all the considerers based on answers of each considerer. In this way, it becomes possible to recommend a selection candidate most suitable for all the considerers.

A server provided with at least one of the above-described storage device, receiving unit, degree-of-significance estimating unit and degree-of-recommendation calculating unit, and a terminal of a considerer can be connected with the server by a communication line and the considerer accesses the server, whereby a degree-of-recommendation of all of the selection candidate data may be presented to the considerer without change and/or after processing.

In addition, a medium in which answer data of a considerer can be saved or stored in a reusable form can be provided and/or can be made available.

In addition, a program for assisting consideration of selection according to the present invention is characterized by, in order to ask a person, who is considering at least one selection among selection candidates in at least one field, questions concerning the field of consideration and utilize answers to the questions to assist determination of selection of the considerer, causing a calculating unit, which includes a storage device storing at least one piece of selection candidate data in the field of consideration, at least one evaluation item, evaluation data for each evaluation item with respect to each piece of selection candidate data, and at least one question concerning the field of consideration therein, to function as: a receiving unit for receiving at least one piece of answer data of the considerer to at least one question concerning the field of consideration; a degree-of-significance estimating unit for estimating how much degree-of-significance the considerer attaches to each evaluation item in the field of consideration from the answer data; and a degree-of-recommendation calculating unit for calculating to which degree each selection candidate can be recommended to the considerer from evaluation data for each evaluation item with respect to each piece of selection candidate data in the field of consideration stored in the storage device and a degree-of-significance for the considerer with respect to each evaluation item estimated by the degree-of-significance estimating unit.

In addition, the above-described program may be a program for causing the calculating unit as the presenting unit according to a second aspect of the present invention or retrial processing unit according to the above-described aspect of the present invention.

Moreover, the above-described program may be a program for causing the calculating unit to function as main question determining unit according to the above-described aspect of the present invention when it causes the calculating unit as the above-described receiving unit. Moreover, the above-described program may cause the calculating unit to function as programs according to the above-described aspects of the present invention when it causes the calculating unit to function as the degree-of-significance estimating unit or the degree-of-recommendation calculating unit.

Other features and advantages of the present invention will be apparent from the following description taken in conjunction with the accompanying drawings, in which like reference characters designate the same or similar parts throughout the figures thereof.

The present disclosure relates to subject matter contained in Japanese Patent Application No. 2001-300621, filed on Sep. 28, 2001, and which is expressly incorporated herein by reference in its entirety.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 illustrates a part of an example of a configuration of a question-and-answer database;

FIG. 16 is a list that defines whether each main question should be asked according to knowledge of a commodity and a way of using recommendation of a considerer that are found by pre-questions in the case in which a commodity that the considerer wishes to be recommended is an overseas travel;

FIG. 17 is a table for calculating a degree of necessity of a question according to an answer to a pre-question;

FIG. 18 is a part of an example of a configuration of a commodity database;

FIG. 19 is a table that describes a total evaluation (i.e., degree-of-recommendation) before a considerer answers a question concerning the season;

FIG. 20 is a table for describing a total evaluation (i.e., degree-of-recommendation) after the considerer answers the question concerning the season;

FIG. 21 is a table of weighting among fields of commodities and evaluation items;

FIG. 22 is a table that represents degrees of recommendation of selection candidates calculated for a plurality of considerers and an order of recommendation found from an average of the degrees of recommendation of the selection candidates;

FIG. 23 is a table that represents degrees of recommendation of selection candidates calculated for a plurality of considerers and an order of recommendation found from a weighted average of degrees of recommendation that is weight-averaged by weighting based on a degree of concern and interests of each considerer; and FIG. 24 is a table that represents degrees of significance calculated for a plurality of considerers, a weighted degree-of-significance that is the weighted degree-of-significance by weighting based on a degree of concern and interests of each considerer and an order of recommendation that is found from a total degree-of-recommendation found from the weighted degree-of-significance.

DETAILED DESCRIPTION OF THE PREFERRED EMBODIMENTS

Preferred embodiments of the present invention will be hereinafter described with reference to the accompanying drawings. Further, the present invention is not limited to embodiments described in this specification but can be modified in various ways within the scope of claims.

Figure 1:
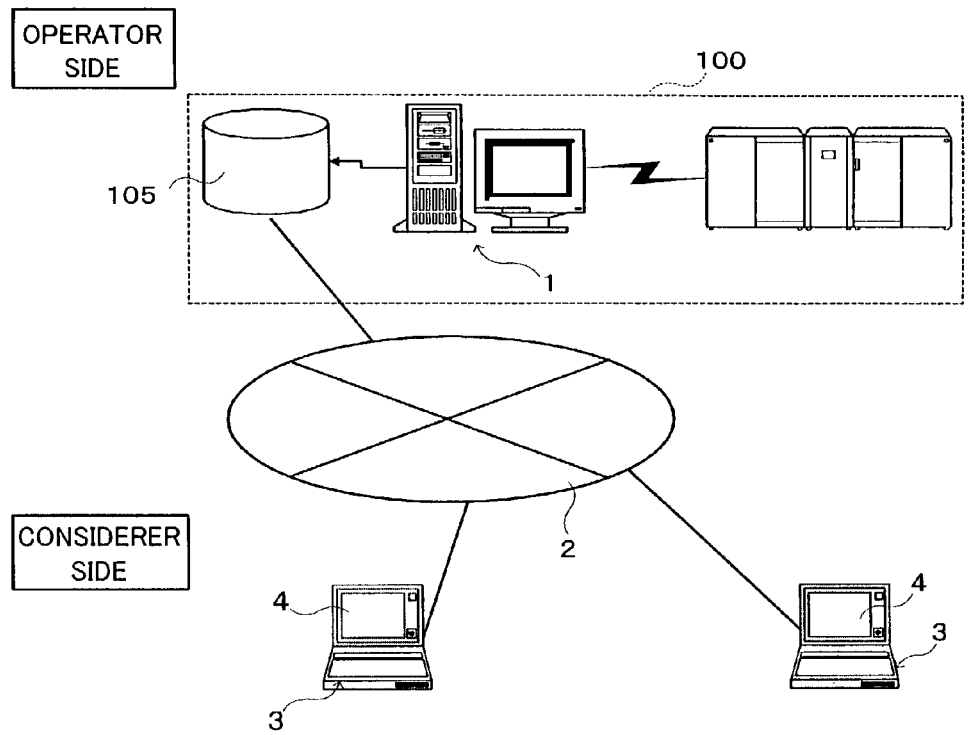
FIG. 1 is an overall view showing a server on an operator side that realizes a system for assisting consideration of selection of the present invention and terminals on considerer sides.

FIG. 1 is an overall view showing an embodiment of a system for assisting consideration of selection of the present invention. This system 100 has a consideration of selection assisting server 1 as shown in FIG. 1. Data necessary for assisting determination of selection of a considerer are stored in storage device 105 in this server 1. This consideration of selection assisting server 1 is connected to a line 2 such as the Internet such that the server 1 displays questions stored in the storage device 105 in the server 1 on a display 4 of a terminal 3 such as a computer, a wireless device or a game machine for home use of a considerer that has become connectable to the line 2 such as the Internet via a telephone line and a provider and, at the same time, receives answer signals with respect to the questions from the terminal 3 via the line 2 to perform calculation based on the answer signals.

A system operated by using the line 2 of FIG. 1 will be hereinafter described. In the following description, an entity providing and/or operating the system for assisting consideration of selection according to the present invention is specifically referred to as an operator and a considerer answers questions prepared by the operator in this embodiment. It is noted that the questions themselves can be communicated to the considerer by conversation between the operator and the considerer, sending printed matter or sending a recording medium such as a compact disk or a flexible disk.

However, a method of showing the questions stored in the storage device 105 in the server 1 of the system 100 on the display 4 of the terminal 3 of the considerer through the line 2 as in this embodiment, is advantageous in that (1) a question flow for determining contents of subsequent questions from contents of the answers to previous questions can be easily realized, (2) labor of the operator can be reduced, (3) a capacity of a disk that should be prepared in the terminal 3 of the considerer can be reduced, or the like.

In addition, this system for assisting consideration of selection may operate by reading programs stored in a recording medium such as a compact disk or a flexible disk from a reading device such as a CD drive or a flexible disk drive of the server 1 of the operator and copying the program in a hard disk of the server 1 of the operator. In addition, as the recording medium, an optical recording medium such as a DVD, a magnetic recording medium such as an MD or an IC card can also be used in addition to the above-mentioned media.

Although any method may be used as a method with which the considerer answers, contents of an answer are required to be recorded such that the answer can be utilized as electronic data in a computer system of the system for assisting consideration of selection of the present invention.

Figure 3:
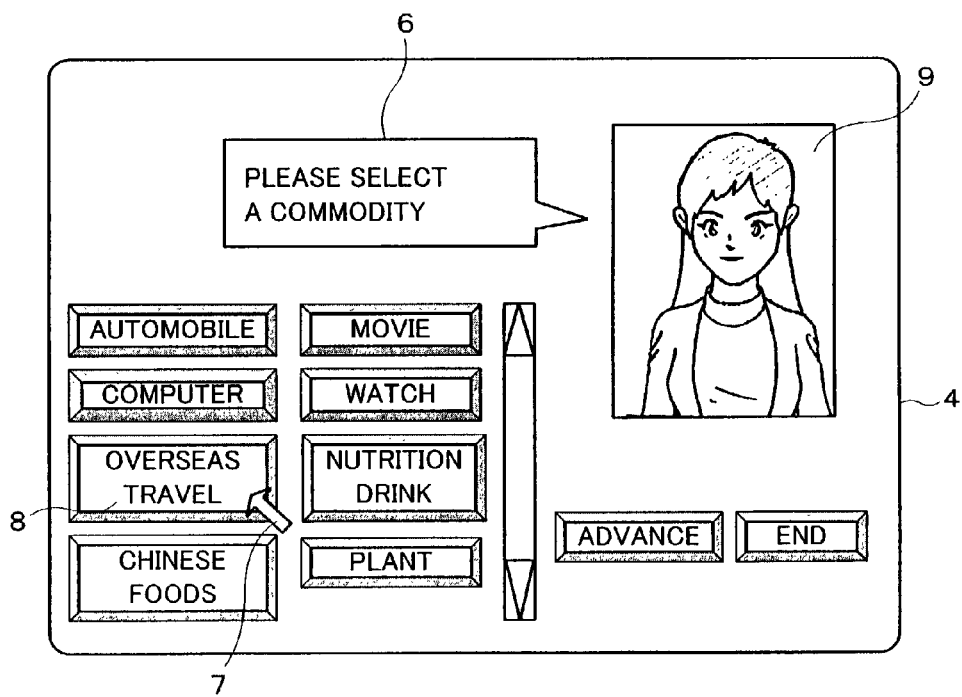
FIG. 3 illustrates an example of an initial screen of questions that is shown on a display of a terminal of a considerer.

As shown in FIG. 3, the considerer clicks a pertinent answer with a mouse, or inputs it from a keyboard with respect to a question, for example, denoted by reference numeral 6 shown on the display 4 of the terminal 3 of the considered, to store contents of the answer in the storage medium in the terminal 3 of the considerer or store the contents in the storage device 105 in the consideration of selection assisting server 1 of the operator through the line 2. In this embodiment, each time the considerer inputs an answer signal in the terminal 3, the answer signal is sent to the consideration of selection assisting server 1 through the line 2.

Figure 2:
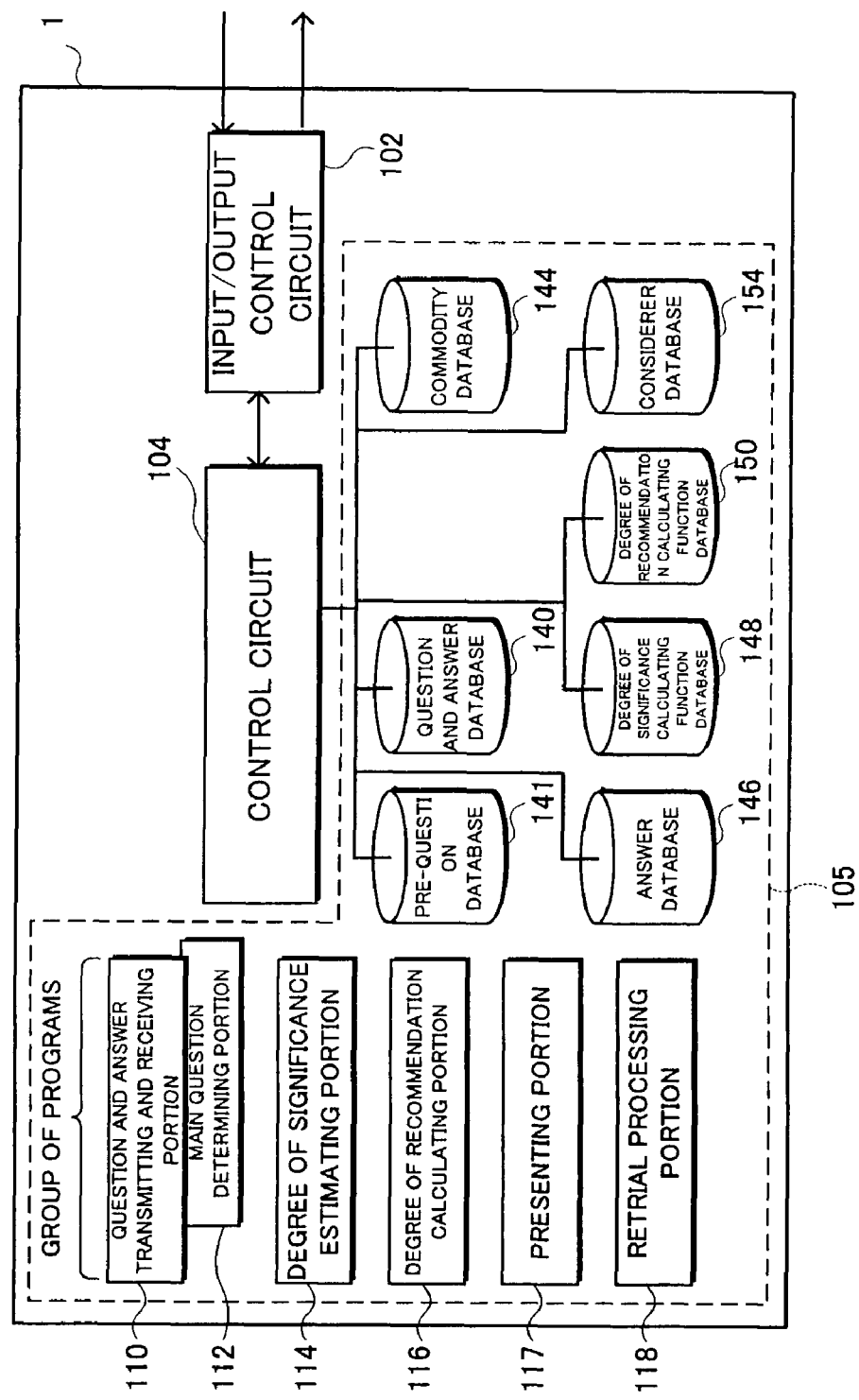
FIG. 2 is a detailed block diagram showing an embodiment of the system for assisting consideration of selection of the present invention.

FIG. 2 is a detailed block diagram of the consideration of selection assisting server 1. This consideration of selection assisting server 1 has an input/output control circuit 102 for controlling input and output of electronic data with the terminal 3 connected via the line 2, a control circuit 104 that has a CPU, a ROM, a RAM or the like and performs transfer of electronic data, calculation, temporary storage of electronic data and storage of a main program, and storage device 105 such as a hard disk.

Various programs are stored in the storage device 105 and the system for assisting consideration of selection according to the present invention operates based on some programs among the various programs. As a program for assisting consideration of selection that executes a series of processing for assisting consideration of selection by this system for assisting consideration of selection, a program for causing the consideration of selection assisting server 1 to function as a question-and-answer transmitting and receiving portion (unit) 110, a degree-of-significance estimating portion (unit) 114, a degree-of-recommendation calculating portion (unit) 116, a presenting portion (unit) 117 and a retrial processing portion (unit) 118 is provided. The question-and-answer transmitting and receiving portion 110 has a program for causing the consideration of selection assisting server 1 to further function as a main question determining portion (unit) 112.

Moreover, in the storage device 105 of the consideration of selection assisting server 1, there are provided various databases storing electronic data necessary for assisting determination of selection of a considerer and, in addition, display files, image files, motion picture files, voice files or the like for displaying a question screen or the like are stored.

As the various databases, there are provided a question-and-answer database 140 in which electronic data of questions to be asked a considerer and answer options to the questions are stored, a pre-question database 141, a commodity database 144 in which electronic data of evaluation items of commodities as selection candidates are stored, an answer database 146, a degree-of-significance calculation function database 148, a degree-of-recommendation calculation function database 150, a considerer database 154 or the like.

In order to make descriptions more specific, it is hereinafter assumed that the system is a system for assisting a considerer who considers purchase of a commodity (including a service; this is the same for the following descriptions). More specifically, it is assumed that a considerer has an object of receiving a recommendation concerning an overseas travel and accesses the system 100 using the line 2.

In the system for assisting consideration of selection that is configured as described above, details of actions of the above-described functions and a database of the actions will be hereinafter described.

FIG. 3 is an example of an initial screen of questions shown on the display 4 of the terminal 3 of a considerer, the question data being sent from the question-and-answer transmitting and receiving portion 110 via the line 2. The questions can be asked by the considerer in an arbitrary method. The questions may be displayed in a balloon that is out from a symbol character 9 as shown in FIG. 3 or may be represented by voices as if the symbol character 9 is speaking to the considerer. An initial question is for requesting selection of a commodity type, that is, a field on which the considerer wishes to be assisted in selecting a commodity. Here, it is assumed that the considerer set a mouse cursor 7 on an icon 8 of "overseas travel" and clicked it based on the above-described scenario.

Here, since no special qualification is required of the considerer, an operation for specifying the considerer is basically unnecessary. However, since information such as information on who answered a question and when it was answered, is convenient for recalculation later and reutilization of data, it is preferable to arrange such that considerer information can be specified by an identification number and a password. For this purpose, it is desirable to display a screen for requesting a considerer to input of an identification number and a password before displaying the screen of FIG. 3.

Alternatively, it is desirable to give an identification number and a password to a considerer who uses the system for the first time after the use, and to store the identification number and the password of the considerer in the considerer database 154. Answer data of the considerer's past answers are stored in the answer database 146 in association with the identification number of the considerer.

Figure 4:
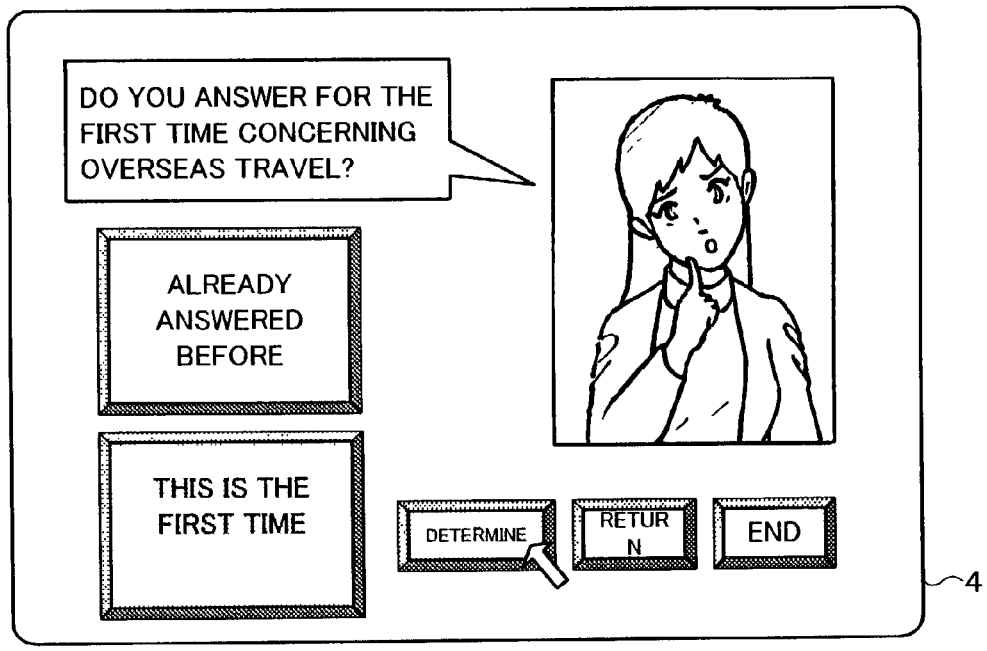
FIG. 4 illustrates an example of a screen of questions that is shown on the display on the terminal of the considerer following FIG. 3.

When a commodity type is selected on the screen of FIG. 3, the system advances to FIG. 4 and requests the considerer to select a button of "already answered before" or a button of "answer for the first time" with respect to a question concerning recommendation of the pertinent commodity. If the button of "already answered before" is selected, data recorded in the past are loaded from the answer database 146.

When the button of "answer for the first time" is selected in FIG. 4, pre-questions start. The pre-questions are one or more questions that would be premises. An object of the pre-questions is to extract main questions suitable to the considerer out of groups of a large number of questions. The pre-questions are stored in the pre-question database 141. The main question determining portion 112 of the question-and-answer transmitting and receiving portion 110 extracts a pre-question from the pre-question database 141 and embeds the question and options corresponding to it in a question screen file to send the question screen file to the considerer and also receives an answer from the considered.

Figure 5:
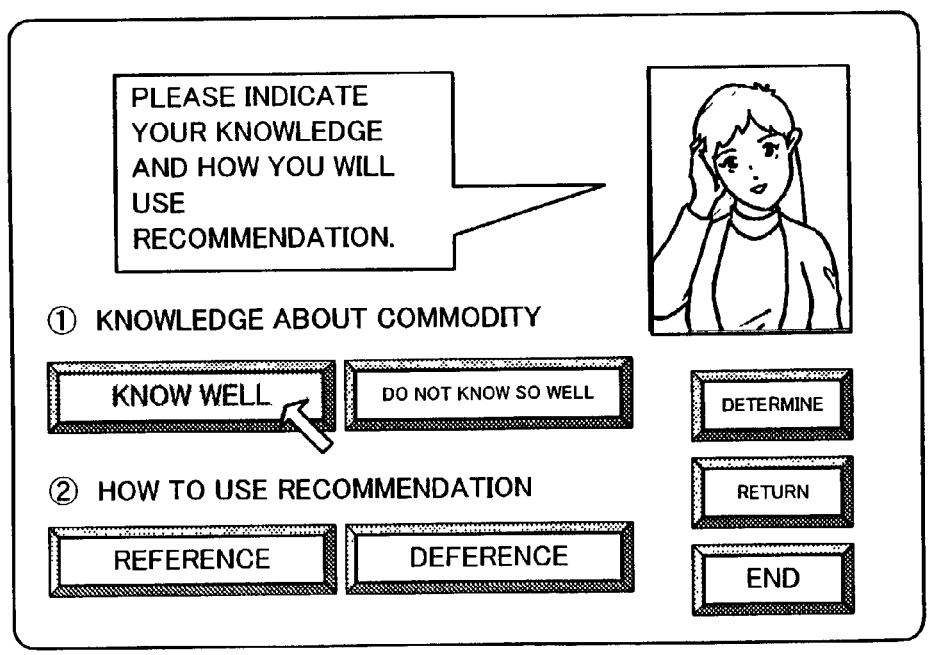
FIG. 5 illustrates an example of a screen of pre-questions that is shown on the display of the terminal of the considerer following FIG. 4.

For example, as shown in FIG. 5, knowledge of the considerer about a commodity and a way of using a recommendation of the considerer are questioned first as pre-questions, whereby the considerer is classified into one of four types of "knowing a commodity very well and using a recommendation simply as a reference of purchase" (type I), "knowing a commodity well and attaching significance to a recommendation" (type II), "not knowing a commodity very well and using a recommendation simply as a reference of purchase" (type III) and "not knowing a commodity very well and attaching significance to a recommendation in purchasing the commodity" (type IV). Further, the pre-questions may be prepared for each commodity type and may be selected according to a commodity type selected in FIG. 3.

Next, upon receiving the answer of the screen shown in FIG. 5, the main question determining portion 112 of the question-and-answer transmitting and receiving portion 110 extracts a group of questions from the question-and-answer database 140 according to the selected commodity type and a classification of knowledge about a commodity and a type of a way of using the recommendation. The question-and-answer transmitting and receiving portion 110 embeds a question and options corresponding to the question in a question screen file for each question and sends the question screen files to the considerer and also receives answers from the considerer.

For example, groups of a large number of questions are stored in the question-and-answer database 140 in advance as shown in FIG. 15. For each of the questions, a question ID (QID), contents of a question (Q), a type of the question (I), options with respect to the question (A1, A2, ... ) and answer data (D1, D2, ... ) that are used for calculating a degree-of-significance to be described later when a corresponding option is selected, are prepared.

The type of a question T is a type that represents whether a question should be asked four types of considerers (I, II, III and IV) classified by the pre-questions in the above-mentioned case.

For example, it is assumed that a question that is only asked the type I is a type $T_{1000}$, a question that is only asked the type II is a type $T_{0100}$, a question that is only asked the type III is a type $T_{0010}$, a question that is only asked the type IV is a type $T_{0001}$, a question that is asked the types I and II is a type $T_{1100}$, ... and a question that is asked all the types is a type $T_{1111}$. Since there cannot be a question that is not asked any type, the number of types of question are $2^4-1$.

More specifically, in the example of overseas travel, each main question is assigned to a corresponding type based on which type among the types I, II, III and IV the question is asked according to a characteristic of the question as shown in a table in FIG. 16 as an example.

The pre-questions are asked as described above, whereby questions suitable for the considerer can be selected out of groups of a large number of questions according to knowledge about a commodity and a way of using a recommendation of each considerer.

That is, it is meaningful to ask a person who knows a commodity well, questions on experiences and a specific concern about the commodity. In addition, elementary questions are omitted and only sophisticated questions are asked to reduce the labor of answering of the considerer.

On the other hand, it would be appropriate to ask a person who does not know a commodity very well, which type of attribute and inclination the person has and what kind of destination of travel the person wishes, in order to provide a recommendation in accordance with statistical data.

In addition, it is preferable to present options that are fresh to a person who uses the recommendation simply as reference. Questions from a viewpoint that is different to some extent should be added to query such a person in order to avoid presenting only normal and dull options. On the other hand, completely orthodox options should be presented to a person who selects a commodity attaching significance to a recommendation result, and a question that displays unusualness is meaningless. Moreover, selection of more detailed and accurate questions becomes possible by adding other pre-questions.

Further, instead of the method of classifying main questions into types according to answers to pre-questions in advance as in FIG. 15, the main question determining portion 112 may calculate a parameter such as a degree of necessity of a question for each main question item.

First, each main question is classified according to a content of each question. For example, a main question "which do you prefer, a place where you go for the first time or a place where you are accustomed to go?" is classified as a main question concerning a destination.

Then, it is assumed that a degree of necessity of the main question is N (destination) and points (which are referred to as n01 (destination), n02 (destination), n03 (destination) and n04 (destination)) corresponding to N (destination) are given to each answer (for example, four answers to the above-described four classification questions n0 are referred to as n01, n02, n03 and n04) of pre-questions (n0, n1, n2, n3 ... ), as an example, as shown in FIG. 17.

When an answer of a considerer to the pre-question n0 is n01, an answer of the considerer to the pre-question n1 is n13, an answer of the considerer to the pre-question n2 is n23..., N (destination) can be represented by the expression, N (destination)=n01 (destination)+n13 (destination)+n23 (destination)+.... Processing of these points is not limited to simple addition as in the above-described expression, but may take various methods. Then, when the pre-questions ends, main questions with a calculated degree of necessity N (classification of a question) that satisfy a certain fixed standard may be selected as questions that should be asked the considerer or several main questions may be selected in the order of the magnitude of the degree of necessity N.

As described above, the method of determining a main question by calculating a degree of necessity is more preferable than the method of preparing a table of main questions to be asked in advance as shown in FIG. 16. That is, the number of patterns of main questions that are prepared in advance does not become enormous even if the number of pre-questions increases, labor required for preparation is reduced, a load to the system is decreased and a change in the operator's way of thinking, if any, can be appropriately and promptly reflected.

Figure 6:
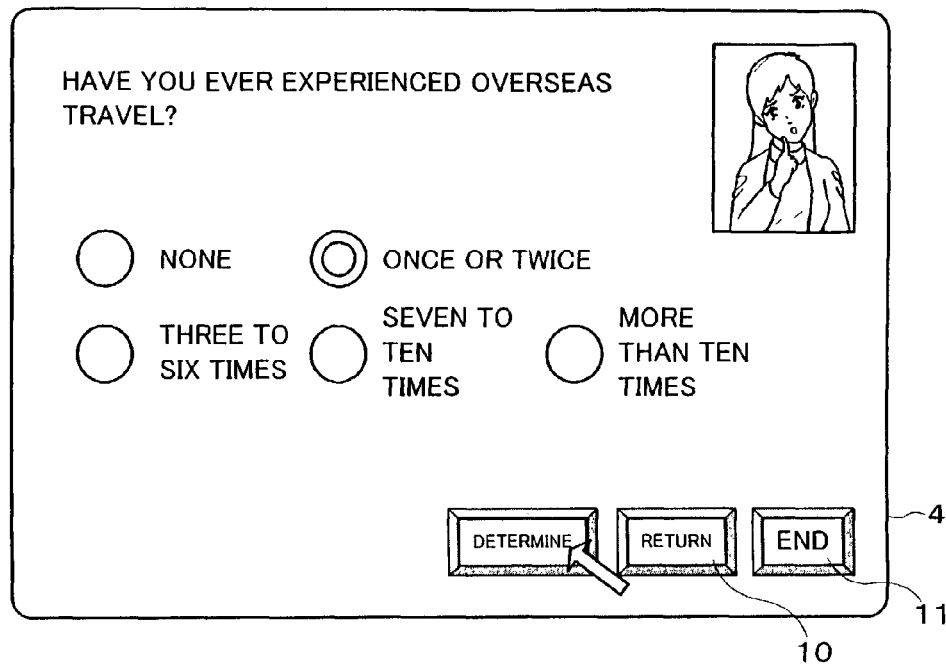
FIG. 6 illustrates an example of a screen of main questions that is shown on the display of the terminal of the considerer following FIG. 5.
Figure 7:
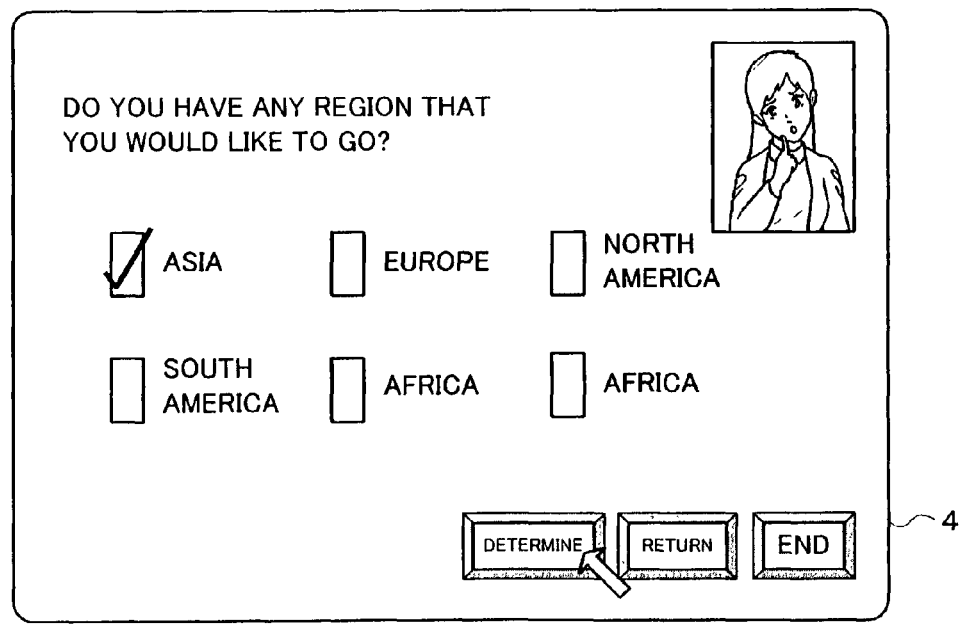
FIG. 7 illustrates an example of a screen of main questions that is shown on the display of the terminal of the considerer following FIG. 6.

In this way, when the pre-questions finish, the system then sequentially displays questions selected from the question-and-answer database 140 according to answers to the pre-questions, and options of answers to the questions to request the considerer to select the options as shown in the examples of FIGS. 6 to 9. In the example of FIG. 6, the considerer selects once or twice as an experience of overseas travel and, in the example of FIG. 7, the considerer selects Asia as a region to where the considerer wishes to travel.

The degree-of-significance estimating portion 114 and the degree-of-recommendation calculating portion 116 (to be described below) are always activated while the question-and-answer transmitting and receiving portion 110 sends each question and options to the terminal 3 of a considerer, causes the display 4 of the terminal 3 to display the question and option and receives an answer to the question. Portions 114, 116 calculate a degree-of-significance and a degree-of-recommendation each time they receive an answer to calculate a total evaluation (i.e., degree-of-recommendation) of each commodity at that point in time.

Figure 8:
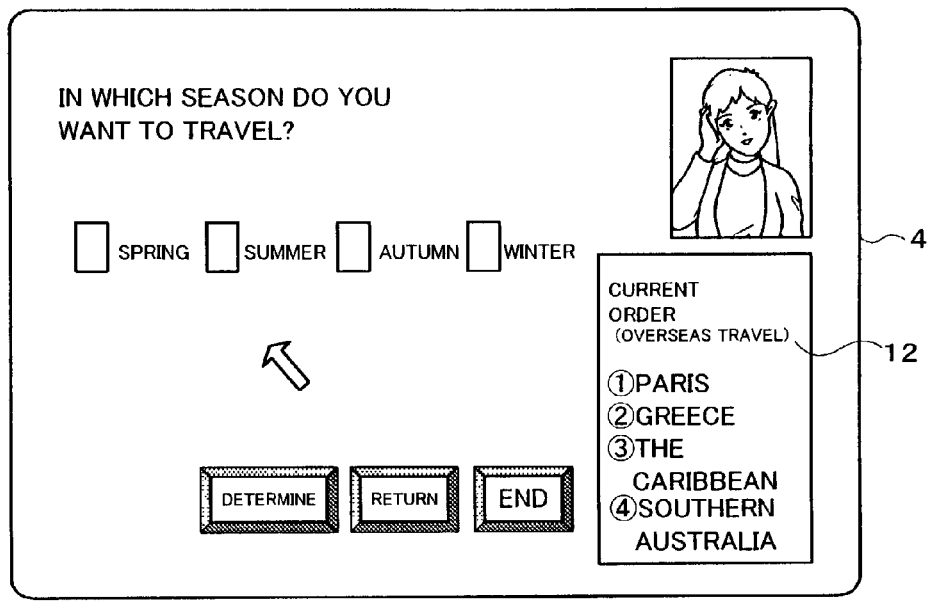
FIG. 8 illustrates an example of a screen of main questions that is shown on the display of the terminal of the considerer.
Figure 9:
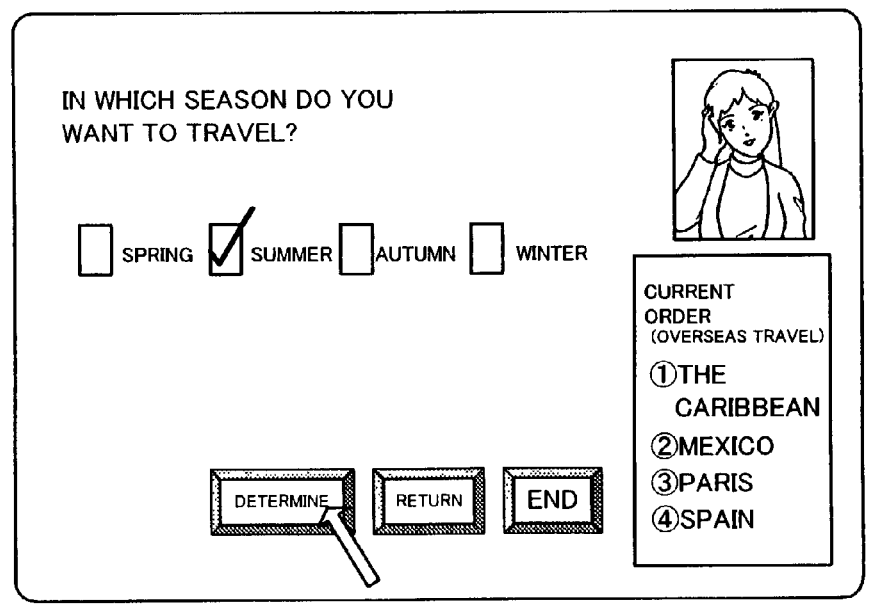
FIG. 9 illustrates an example of a screen of the display of the terminal of the considerer following FIG. 8.

For example, in FIG. 8, the presenting portion 117 displays an order of the total evaluations as a preliminary order 12. Each time the degree-of-significance estimating portion 114 and the degree-of-recommendation calculating portion 116 receive an answer to each question, they execute a recalculation of a degree-of-significance and a degree-of-recommendation and change an order of commodities, as shown in FIG. 9, according to a re-total evaluation (i.e., degree-of-recommendation) of commodities. The system may be configured such that the degree-of-significance estimating portion 114 and the degree-of-recommendation calculating portion 116 are activated after all questions are asked and all answers are received, and they perform estimation of a degree-of-significance and a degree-of-recommendation to calculate a total evaluation (i.e., a degree-of-recommendation) of commodities.

An icon 10 with which a considerer can return to an immediately preceding question by clicking it may be displayed in the display 4 as shown in FIG. 6 in addition to options of answers to a question. Consequently, when an answer is wrong or reconsideration occurs to a considerer, the considerer can revise an answer easily.

A main question is not basically different from a pre-question as long as a display form of the display 4 is concerned. FIGS. 6 to 9 show an example of the main question.

The question-and-answer transmitting and receiving portion 110 sequentially draws out questions and options, corresponding to the questions in the order of smallness of question IDs with respect to a group of questions extracted by the main question determining portion 112 from the question-and-answer database 140 according to types classified by the pre-questions, embeds the data in a question image file to send it and receives answers. The main questions can be asked as defined by an order without specifically changing the order.

However, the present invention is not limited to this and a question to be asked next may be changed depending on an answer from a considerer. In this case, it is preferable that a flow chart, in which the next question ID is determined according to an answer of a preceding question, is stored in the question-and-answer database 140 in advance and the next question ID is referred to by this flow chart.

An answered option is temporarily stored in the control circuit 104. As data to be stored, a question ID of a question that is asked a considerer, an answer to the question-and-answer data (D0, D1, D2, . . . ) that corresponds to the answer and is used for estimating a degree-of-significance, are associated with each other and stored. In general, if a question asks a degree of something and cannot have a plurality of answers or does not allow a plurality of answers (for example, the example of FIG. 6 corresponds to this), the answer data (D0, D1, D2, . . . ) to be stored are numerical values representing a magnitude of the degree.

On the other hand, if a question is one that requests to cause a considerer to select any one from options and allows a plurality of answers (for example, the examples of FIGS. 7 and 8 correspond to this), the answer data (D0, D1, D2, . . . ) to be stored are numerical values for identifying selected options.

The degree-of-significance estimating portion 114 has a function or, according to a received answer result of a considerer, finding a degree-of-significance that represents to which evaluation item with respect to a commodity the considerer attaches significance. Evaluation items are defined for each commodity type. If a commodity type is overseas travel as in this example, a multiplicity of evaluation items such as costs, safety, local meals, local means of transportation, scenery, a degree-of-significance of the seasons/a degree of attractiveness of each season, or the like are defined in advance and stored in the commodity database 144. Such can be performed for each commodity type.

Then, each time any one option is selected out of answer options in response to each question, a degree-of-significance that the considerer has is calculated with respect to each evaluation item $I_1$. Whereas a degree-of-significance of a considerer with respect to a specific one evaluation item may be found by an answer to certain one question, a degree-of-significance of each considerer with respect to a certain other specific evaluation item may be found more appropriately by organically combining answers to a plurality of questions. In contrast, a degree-of-significance of a considerer with respect to a specific plurality of evaluation items may be found by an answer to one question.

In addition, as one way of asking a question, there is a method of directly asking whether or not a considerer attaches significance to the evaluation item. For example, if a question "Do you attach significance to costs ($I_m$)?" is asked a considerer, a degree-of-significance $P_m$ of the costs can be assumed as $P_m=1$ if an answer is "Yes", $P_m=0$ if "No". Alternatively by increasing options of an answer, can be assumed as $P_m=1$ if "attaching high significance", $P_m=0.7$ if "moderately attaching significance" and $P_m=0.3$ if "not attaching much significance" and $P_m=0$ if "indifferent at all". That is, $$P_m = p_m(D_k) = D_k = 1 \text{(when } A0 \text{ is selected)}$$
$$= 0 \text{(when } A1 \text{ is selected)}$$

Here, the subscript k represents a question ID of a question $Q_k$: "Do you attach significance to costs?" and $D_k$ is answer data of a considerer with respect to the question $Q_k$. $p_m(D_k)$ indicates a function for calculating a degree-of-significance with respect to an evaluation item of costs from an answer to the question $Q_k$. A0 corresponds to an option of "Yes" and A1 corresponds to an option of "No". Alternatively, $$P_m = p_m(D_k) = D_k = 1 \quad \text{(when } A0 \text{ is selected)}$$
$$= 0.7 \text{(when } A1 \text{ is selected)}$$
$$= 0.3 \text{(when } A2 \text{ is selected)}$$
$$= 0 \quad \text{(when } A3 \text{ is selected)}$$

Here, A0 corresponds to an option of "attaching high significance", A1 corresponds to an option of "moderately attaching significance", A2 corresponds to an option of "not attaching much significance" and A3 corresponds to an option of "indifferent at all".

However, in addition to the above, it is possible to set, for example, a question $Q_k$: "Do you have a strong preference for foods?", a question $Q_{k+1}$: "Do you make much of daily eating habits?", a question $Q_{k+2}$: "Do you actively experience something new or unusual while traveling?", a question $Q_{k+3}$: "Do you have any reasons why you consider your health and physical conditions?" or the like, prepare four options of "very . . . (strong, make much of, actively, strong reasons)", "slightly . . . ", "not so . . . " and "not . . . at all" for each of the questions, associate each piece of answer data with points 1.0, 0.7, 0.3 and 0 and average answer data of these plurality of questions to have a value of a degree-of-significance $P_f$ of a local meal (f). That is, $$P_f = p_f(D_k, D_{k+1}, D_{k+2}, D_{k+3})$$
$$= Ave(D_k, D_{k+1}, D_{k+2}, D_{k+3})$$

Here, the answer data $D_k$ is as follows.

$$D_k = 1 \quad \text{(when } A0 \text{ is selected)}$$
$$= 0.7 \text{(when } A1 \text{ is selected)}$$
$$= 0.3 \text{(when } A2 \text{ is selected)}$$
$$= 0 \quad \text{(when } A3 \text{ is selected)}$$

A0 represents an option of "very . . . ", A1 represents an option of "slightly . . . ", A2 represents an option of "not so . . . " and A3 represents an option of "not . . . at all".

However, when the degree-of-significance $P_f$ is calculated, it may be appropriate to perform a calculation indicated by the expression below to lead the degree-of-significance $P_f$ of a considerer who gets a high point of the answer data $D_{k+3}$ with respect to the question $Q_{k+3}$, to around 0.7, because a gourmet-like selection should rather be avoided if a point of the answer data $D_{k+3}$ with respect to the question $Q_{k+3}$ is high. That is, $$P_f = p_f(D_k, D_{k+1}, D_{k+2}, D_{k+3}) = \frac{\frac{D_k + D_{k+1} + D_{k+2}}{3} + 0.7 D_{k+3}}{1 + D_{k+3}}$$

In addition, it might be appropriate that a degree-of-significance $P_s$ for safety is calculated to be a little bit low for a considerer who gets a high point of the answer data $D_{k+2}$ with respect to the question $Q_{k+2}$: "Do you actively experience something new or unusual while traveling?" In this way, an expression may be set that does not limit the association of the answer data $D_k$ and the degree-of-significance $P_i$ to one-to-one relationship but allows various relationships.

As described above, since various relationships are established among the answer data $D_k$ and the degrees of significance $P_m$, $P_f$, . . . of a considerer depending on evaluation items, all of the degree-of-significance calculating functions $p_m$, $p_f$, . . . representing these relations are stored in the degree-of-significance calculating function database 148, whereby how much degree-of-significance that the considerer gives to each evaluation item can be more appropriately reflected using various means on calculation. In addition, it is also possible to incorporate an analysis result of marketing researches conducted by each enterprise in these degree-of-significance calculating functions. In this way, a degree-of-significance may be calculated that is more appropriate and matches each considerer better by combining a plurality of questions organically.

Degree-of-significance calculating function $p_i$ of an evaluation items $I_i$ is stored in the degree-of-significance calculating function database 148 for each evaluation item $I_i$. However, the number of degree-of-significance calculating functions to be used for one evaluation item is not limited to one but a plurality of degree-of-significance calculating functions such as $p_{ia}$, $p_{ib}$, . . . may be used. This is because questions to be asked a considerer are different depending on a type of the considerer to be determined by the pre-questions or depending on a method of answering by the considerer in the past.

Further, it is assumed that an initial value (for example, 0.5) is given to a degree-of-significance in advance until answer data $D_k$ required for determining the degrees-of-significance of the evaluation items $I_1$, are inputted. As a result, even before a considerer finishes answering all questions, a total evaluation of each commodity at that point becomes possible based on a preliminary degree-of-significance with respect to each evaluation item at that point.

The degree-of-significance estimating portion 114 estimates a degree-of-significance with referring to the control circuit 104 that, each time an answer is returned, accumulates an answer history of a considerer up to that point and the degree-of-significance calculating function database 148.

Next, the degree-of-recommendation calculating portion 116 is for calculating a degree-of-recommendation for each commodity in order to determine an order of commodities to be recommended using the degree-of-significance estimated by the degree-of-significance estimation portion 114.

In order to find this degree-of-recommendation, the commodity database 144 is provided for each commodity type. Data including commodity names or the like representing a plurality of commodities to be a recommendation candidate for each commodity type are stored in the commodity database 144, and data of all evaluation of each evaluation item are also stored therein in advance with respect to each commodity.

FIG. 18 shows an example of the commodity database 144. Points $E_{ji}$ (se) (for example, $0 <= E_{ji}(se) <= 1$) for each evaluation item are stored in advance with respect to travel destinations $C_j$ (as an example, C1=the Caribbean, C2=Monaco, C3=Nice, C4=Hong Kong, C5=Paris, . . . ) that are commodities of overseas travel. The evaluation of these commodities is not always the only one for each evaluation item.

For example, a tourist season is in summer or winter when people take long vacations and costs in summer or winter naturally increase. In this way, since an evaluation of evaluation items such as costs, local meals and sceneries also change according to the seasons, an evaluation of each evaluation item is dependent on the seasons. Reference character "se" represents the seasons (spring: sp, summer: su, autumn: au and winter: wi).

For example, if a considerer selects only one season in response to a question "in which season do you want to travel?", then values of the selected season are employed, respectively. If the considerer selects spring (sp), then the evaluation of the Caribbean (C1) of costs ($I_m$) is $E_{lm}$ (sp). If the considerer selects a plurality of seasons, then an average value of corresponding evaluations is employed. For example, if spring and summer are selected, as the value of the Caribbean of costs, then an average value of spring and summer is employed as ($E_{lm}$(sp)+$E_{lm}$(su))/2. In addition, if the considerer selects no season, or until the question "in which season do you want to travel?" is asked or the question is not asked, then an average value of the four seasons is employed.

In addition, degrees of attractiveness of the seasons can be set such that a sum of degrees of attractiveness of all the seasons ($E_{lse}$ (sp), $E_{lse}$ (su), $E_{lse}$ (au) and $E_{lse}$ (wi)) becomes one. For example, as shown in FIG. 18, the degrees of attractiveness of the seasons of the Caribbean can be set as a degree of attractiveness of spring $E_{lse}$ (sp)=0.2, a degree of attractiveness of summer $E_{lse}$ (su)=0.7, a degree of attractiveness of autumn $E_{lse}$(au)=0.1 and a degree of attractiveness of winter $E_{lse}$ (wi)=0. In the case of FIG. 18, it is indicated that, if a considerer travels to the Caribbean, summer is much more attractive than other seasons and winter is not attractive.

However, rather than a method of calculating all the evaluations for each season being calculated in advance as shown in the table of FIG. 18 and storing all the evaluations in the commodity database, it is also possible to make an evaluation of each evaluation item a single value, prepare seasonal adjustment values as correction values for the single value and, for example, add or subtract the correction values to and from the single value.

In addition to parameterizing the seasons as in the table of FIG. 18, it is also possible to adjust evaluations according to parameters other than the seasons.

In relation to the above-mentioned seasons, a degree-of-significance calculation function $p_{se}$ for calculating degrees of significance of the seasons $P_{se}$ ($P_{sp}$, $P_{su}$, $P_{au}$, $P_{wi}$) can be defined by the following table and can be set as shown in the table according to the number of selected seasons.

TABLE 1

| Number of selected seasons | Degree-of-significance of season of selected season | Degree-of-significance of season of unselected season |
|---|---|---|
| 0 | — | 0.25 |
| 1 | 1 | 0 |
| 2 | 0.5 | 0 |
| 3 | 0.33 | 0 |
| 4 | 0.25 | — |

The degree-of-recommendation calculating portion 116 is different from the conventional art in that a degree-of-recommendation is found taking into account a degree-of-significance with respect to each evaluation item of a considerer calculated by the degree-of-significance estimating portion 114. In the conventional art, the fact that an item to which significance is attached changes depending on a considerer is not taken into account. For example, an evaluation of each item is simply totaled, as shown in Equation (1) below, or only evaluations of items to which a considerer X answers "significance is attached" are totaled at most. That is, if the considerer X attaches significance to costs and safety, a total evaluation (degree-of-recommendation) of the Caribbean is as follows.

$$f(\text{Caribbean}) = E_{lm} + E_{ls} \quad (1)$$

Here, $E_{lm}$ is an evaluation of the Caribbean in terms of costs and $E_{ls}$ is an evaluation of the Caribbean in terms of safety.

On the other hand, in the present invention, a degree-of-significance indicating what kind of evaluation item the considerer X attaches significance to is added to find a degree-of-recommendation by a predetermined function. A degree-of-recommendation calculating function can be any function. As an example, a linear function as shown below is possible as a general one.

$$f(\text{Caribbean}) = P_m \times E_{1m} + P_s \times E_{1s} + P_f \times E_{1f} + \Lambda = \sum_i P_i \times E_{1i} \quad (2)$$

This shows the case in which a degree-of-recommendation is found with a degree-of-significance per se as a weighting of each evaluation item. Moreover, it can be changed as follows taking into account the significance of each evaluation item itself.

$$f(\text{Caribbean}) = \quad (3)$$
$$a_m P_m \times E_{1m} + a_s P_s \times E_{1s} + a_f P_f \times E_{1f} + \Lambda = \sum_i a_i P_i \times E_{1i}$$

A coefficient as is a weighting coefficient. In addition to this, the following functions are possible.

$$f(\text{Caribbean}) = P_m \times E_{lm} \times P_s \times E_{ls} \times P_f \times E_{lf} + \Lambda \quad (4)$$

$$f(\text{Caribbean}) = P_m \times \log E_{lm} + (P_s \times E_{ls})^2 + P_f \times E_{lf} + \Lambda \quad (5)$$

$$f(\text{Caribbean}) = (P_m \times E_{lm} + P_s)^{E_{ls}} + P_f \times E_{lf} + \Lambda \quad (6)$$

Further, a logarithmic function, an exponential function, a power function or the like, or a combination thereof can be used. Moreover, other than adding terms for a plurality of evaluation items, they can be multiplied with each other or they can be substituted into in a relation such as a logarithmic relation, a power relation, an exponential relation or the like. For example, in safety (s) and local transporting means (a), an evaluation of safety may become a more important as an evaluation of local transporting means worsens. In this case, it is more appropriate to make a term for the evaluation of safety $P_s \times E_{ls} \times (1-E_{la})$ or the like rather than simple $P_s \times E_{ls}$.

In this way, various relations are established among a degree-of-recommendation and a degree-of-significance and an evaluation for each evaluation item according to a commodity and according to a characteristic of each evaluation item and a degree of correlation of evaluation items. Thus, a degree-of-recommendation calculating function f representing these relationships are stored in the degree-of-recommendation calculating function database 150 for each commodity in advance, whereby a commodity can be recommended to a considerer more appropriately using various means of calculation.

As described above, since the degree-of-significance estimating portion 114 and the degree-of-recommendation calculating portion 116 calculate a degree-of-significance and a degree-of-recommendation before all questions end, and then recalculate them each time an answer to each question is obtained, a commodity to be recommended changes according to each answer. This will be described more specifically in accordance with FIGS. 8 and 9.

FIG. 8 shows a state before a considerer answers a question "in which season do you want to travel?" An order of f (Hong Kong)>f(Greece)>f(Caribbean)>f (Southern Australia) is established. If the considerer only answers that the season that the considerer wants to travel is "summer" as in FIG. 9, then $P_{su}=1$, $P_{sp}=P_{au}=P_{wi}=0$ in accordance with the definition of Table 1. Seasonality of the Caribbean is given $(E_{lse}(sp) \times 0 + E_{lse}(su) \times 1 + E_{lse}(au) \times 0 + E_{lse}(wi) \times 0) = 0.7 \times 1 = 0.7$ from a numerical value of $1_{se}$ (for example, a degree of attractiveness of seasons) of FIG. 18.

In addition, since a season is selected, an evaluation for a selected season is used for the evaluations, instead of an average value of all the seasons being used in FIG. 18. In particular, as described before, variation due to the seasons is large in costs $E_{lm}$, local meals $E_{lf}$, and sceneries $E_{lv}$, among the evaluation items. If the considerer only answers that the season the considerer wants to travel is "summer", then there are variations in various numerical values compared with values before the considerer answers, such as $E_{lm}$, $E_{lf}$ and $E_{lv}$ adjusted to $E_{lm}(su)$, $E_{lf}(su)$ and $E_{lv}(su)$, respectively, in accordance with the table of FIG. 18.

That is, it is necessary to review (adjust) evaluations itself of destinations of travel depending on a season to which the considerer attaches significance. Thus, when an answer to the question "in which season do you want to travel?" is inputted, as a result of recalculation, an evaluation of a region to which it is preferable to travel in summer is increased, and the Caribbean and Mexico move to higher in rank, as shown in FIG. 9.

Examples of a generalized and a simplified form of the above description as tables are shown in FIGS. 19 and 20. The table of FIG. 19 corresponds to the state of FIG. 8 and degrees of significance depending on answers of the considerer X exist in the table for each item up to the item of sceneries from the left. Since evaluations of costs vary significantly, a destination of travel $C_j$, has a higher total evaluation than a destination of travel $C_j$ at this point. However, if the considerer selects only summer as "a season in which a considerer wants to travel", as shown in FIG. 9, a corresponding state changes, as shown in the table of FIG. 20. Further, for this example, it is assumed that evaluations of only costs, local meals and sceneries change according to the seasons and the other evaluation items do not change according to the seasons. When the considerer selects summer, superiority of the destination of travel $C_j$ is derived, and overturns the high evaluation of the destination of travel $C_{j'}$.

Figure 10:
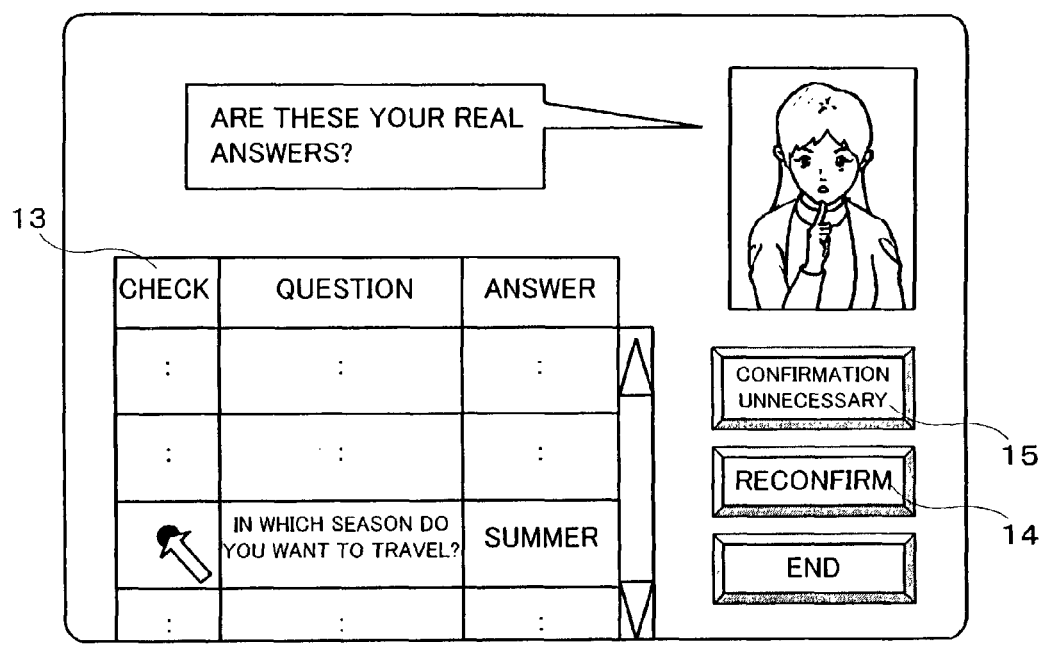
FIG. 10 illustrates an example of a screen of a list of questions and answers to the questions that is shown on the display of the terminal of the considerer alter the considerer answered all the questions.

When all main questions selected by pre-questions finish, the question-and-answer transmitting and receiving portion 110 extracts all questions answered by a considerer and answers to the questions, which are temporarily stored in the control circuit 104, and displays them as a list, as shown in FIG. 10.

When the considerer checks a question that the considerer wants to reconfirm, in a check column 13 and presses a "reconfirmation" button 14, the same screen as FIG. 8 appears and the pertinent question is displayed. If the considerer has no question that the considerer wants to reconfirm, then the considerer can advance to the next step by pressing a "confirmation unnecessary" button 15.

When the "confirmation unnecessary" button 15 is pressed in FIG. 10, the processing advances to the next step and the presenting portion 117 displays a list of degrees of recommendation of selection candidates.

Figure 11:
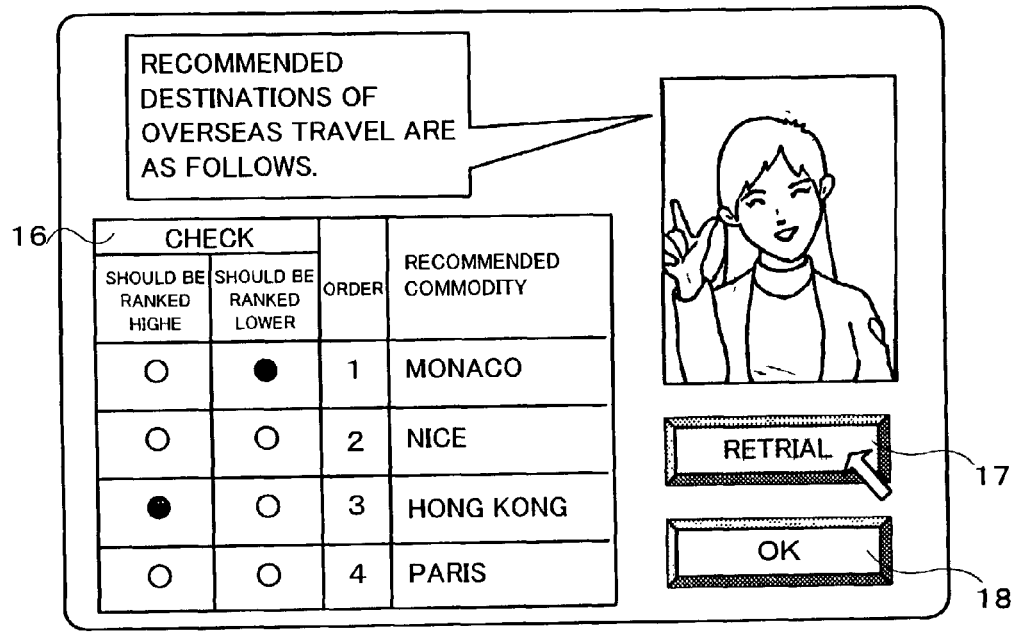
FIG. 11 illustrates an example of a screen of a list of recommended commodities that is shown on the display of the terminal of the considerer.
Figure 12:
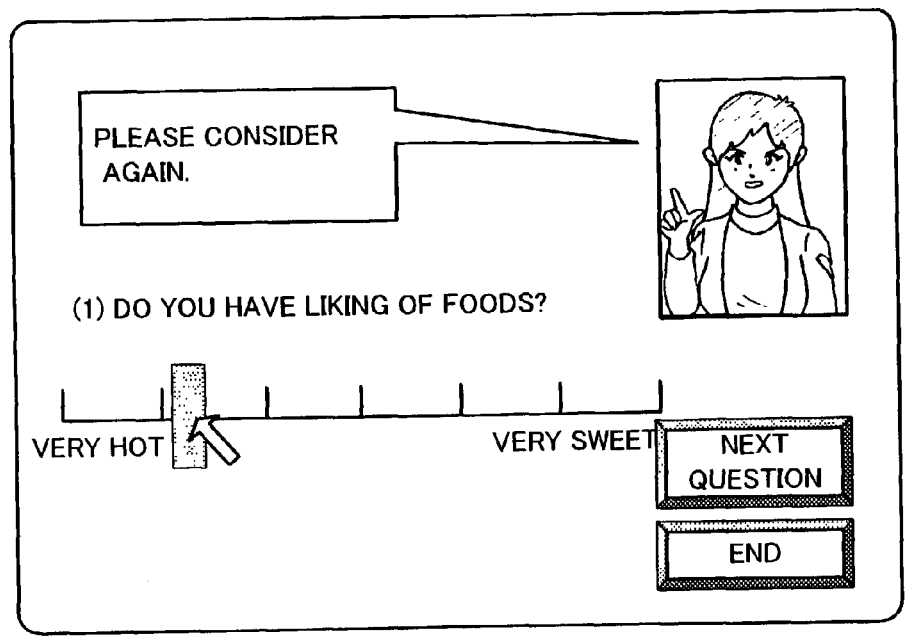
FIG. 12 illustrates an example of a screen of re-questions in a retrial mode that is shown on the display of the terminal of the considerer.

FIG. 11 shows the case in which selection candidates are shown in order from the one with highest degree-of-recommendation. In this case, selection candidates of the order that seems to be appropriate to be presented to the considerer are presented in order from the one with the highest degree-of-recommendation to the lowest. If the considerer is not satisfied with the order of a recommend commodity, then the considerer checks the commodity in the "check column" 16 and presses a "retrial" button 17. Then, the retrial processing portion 118 is activated, and the processing enters a retrial mode shown in FIG. 12.

The retrial processing portion 118 displays questions in a form of a screen (or receiving answers to the questions, as in FIGS. 8 and 9. The questions to be displayed are determined in the following manner.

First, evaluation items that contributed much when a degree-of-recommendation was found for the commodity that the considerer checked as unsatisfactory, are selected. If the considerer checks a recommended commodity $C_j$ thinking that it should be ranked lower and it a degree-of-recommendation is determined based on the above-described expression (2), then evaluation items having a value of a term $P_i \times E_{ji}$ ranked high (for example, upper five ranks) are selected and questions affecting the degree-of-significance $P_i$ are displayed as "your answers to these questions have raised a degree-of-recommendation of the commodity $C_j$" and, at the same time, options for lowering the degree-of-recommendation of $C_j$ in each question are shown.

Conversely, if the considerer checks the recommended commodity $C_j$ thinking that it should be ranked higher and if a degree-of-recommendation is determined based on the above-described expression (2), then evaluation items having a value of a term $P_i \times E_{ji}$ ranked low (for example, lower five ranks) are selected and questions affecting the degree-of-significance $P_i$ are displayed as "your answers to these questions have lowered a degree-of-recommendation of the commodity $C_j$" and, at the same time, options for raising the degree-of-recommendation of $C_j$ in each question are shown.

Then, after receiving only answers to these questions, the retrial processing portion 118 recalculates a degree-of-significance. If, as a result of the considerer reconsidering these questions, the answers are different from the previous answers before entering the retrial mode, the degree-of-significance $P_i$ is recalculated based on data $D'_k$, $D'_{k+1}$, . . . corresponding to the new options and a degree-of-recommendation for each commodity is recalculated. Since answers to questions related to degrees of significance of the evaluation items that contribute most to determination of a total evaluation (i.e., degree-of-recommendation) of the commodity that is regarded unsatisfactory change, a degree-of-recommendation changes. As what is anticipated, it is possible that, since a degree-of-significance having lead the commodity, which the considerer checked thinking that it should be ranked lower, to a higher rank falls, a total evaluation (degree-of-recommendation) of the commodity falls.

Conversely, it is possible that, since a degree-of-significance having lead the commodity, which the considerer checked thinking that it should be ranked higher, to a lower rank rises, a total evaluation (degree-of-recommendation) of the commodity rises.

Then, as shown in FIG. 11, the retrial processing portion 118 shows selection candidates in the order of recalculated degrees of recommendation and waits for an input from the considerer again. If the considerer is satisfied with the order of the recalculated recommended commodities, then an "OK" button 18 is pressed. If the considerer is not satisffor exampled with the recommended commodity yet, then the "retrial" button 17 is pressed. If the "retrial" button 17 is pressed, then questions are asked again so as to review degrees of significance that contributed much and derived the order when a degree-of-recommendation of the retrial was found.

Alternatively, in some cases, even if the considerer reconsiders, then answers to questions are still the same as the answers before entering the retrial mode. In this case, since there may be a gap between a commodity evaluation that the considerer has and a commodity evaluation on the evaluation database rather than between degrees of significance, the commodity evaluation of the evaluation database can be automatically changed.

In changing the evaluation, it is possible to automatically add a predetermined offset amount to an evaluation of an evaluation item that lead a commodity that the considerer checked thinking that it should be ranked lower to a higher rank, to automatically subtract a predetermined offset amount from an evaluation of an evaluation item that lead a commodity that the considerer checked thinking that it should be ranked higher to a lower rank, or the like. It is also possible to cause the commodity database 144 to learn or to optimize the commodity database 144 such that commodity evaluations themselves stored therein are automatically changed when the total number of times of adjustment has exceeded a predetermined number of times for many considerers. Naturally, it is likely that an offset adjustment is prohibited for an item that does not rely on personal sense, or the like, such as safety.

In addition, in this way, the considerer comes to know the considerer's own answer that has led a recommendation with which the considerer is not satisfied in the retrial mode, thereby repeating considerations on whether to change the answer in order to change the presented order of recommendations or to accept the recommendation thinking that the answer is still correct. Thus, the considerer can recognize anew what the considerer keenly attaches significance to in a field of consideration.

Figure 13:
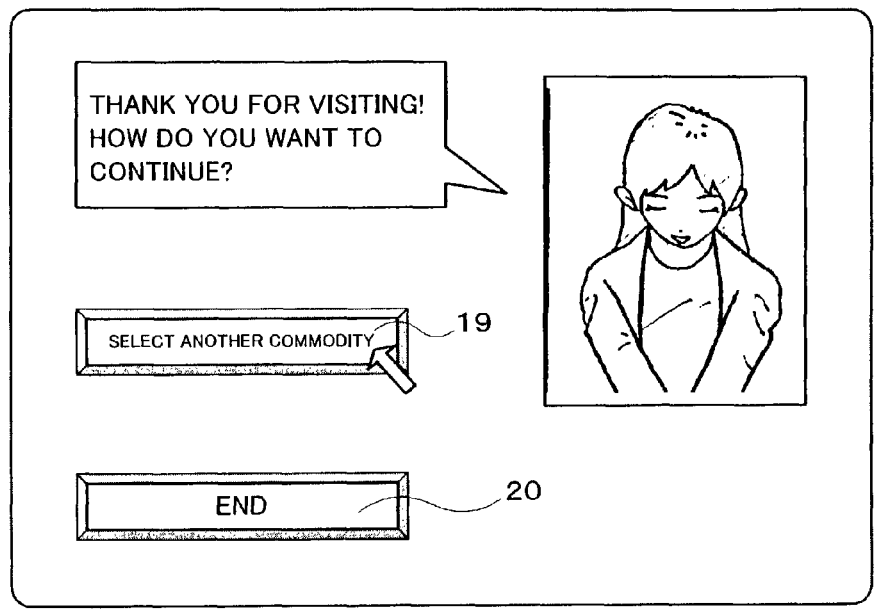
FIG. 13 illustrates an example of an end screen that is shown on the display of the terminal of the considerer.

When the "OK" button 18 is selected on the commodity recommendation screen of FIG. 11, the screen turns into an "end screen", as shown in FIG. 13. At this point, a result of an answer of the considerer and a recommendation may be stored in an answer database 146, or the answer database 146 and storage device of the terminal 3 of the considerer. When a "select another commodity" button 19 is selected, the screen returns to the commodity selection screen of FIG. 3.

Figure 14:
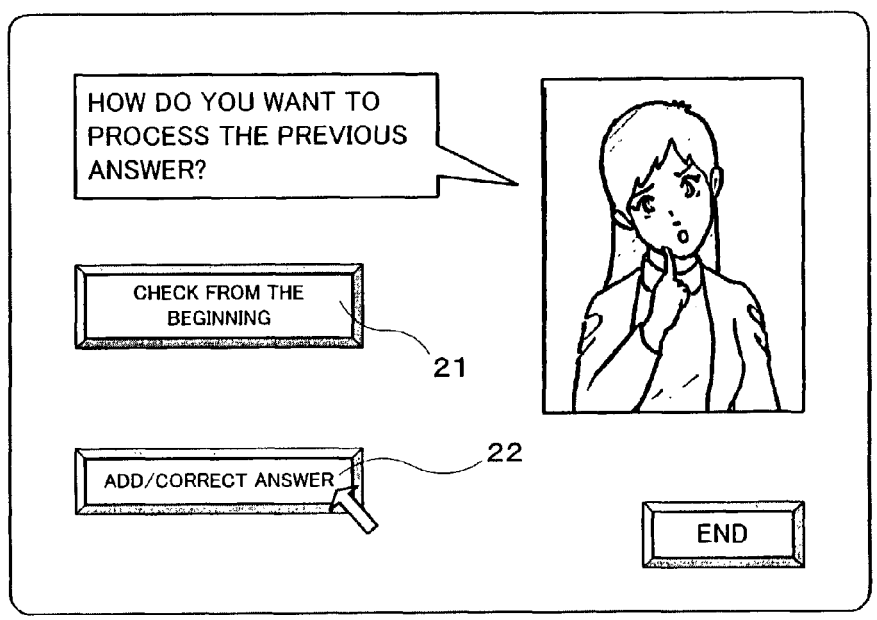
FIG. 14 illustrates an example of a screen that is shown on the display of the terminal of the considerer following the case in which "already answered before" is selected in FIG. 4.

If there are stored data, when the considerer selects "already answered before" in FIG. 4, it is inquired how to process the stored data, as shown in FIG. 14. Then, the results of the answers stored in the answer database 146 are loaded. If the considerer selects a "check from the beginning" button 21 here, then the questions mid the options, as shown in FIGS. 6 to 9, are displayed one by one from the beginning.

If the considerer selects an "add/correct an answer" button 22, then a list of questions and answers, as shown in FIG. 10, is displayed and the considerer checks a question that the considerer desires to add or correct options thereof. The questions and the options as shown in FIGS. 6 to 9 are displayed for the checked question.

When the "end" button on all the figures except FIG. 13 is clicked, the screen turns into the screen of FIG. 13, and the results of answers and/or recommendations to that time are stored in the storage device 105 of the server or the terminal of the considerer and stored in the answer database 146. An identification number for specifying the considerer as well as question IDs, answers to questions corresponding to the question IDs and answer data are stored in the answer database 146. When the "end" button 20 of FIG. 13 is pressed in that state, connection with the server is released and the system terminates.

The data stored in the answer database 146 may be processed as customer data on the operator side. As a method of process, for example, a method of arranging the data by factors such as age and gender in list form is possible. The data can be put to practical use as marketing data in the same manner as a questionnaire.

The above description assumes that a considerer selects one commodity. However, if a considerer wishes to consider selection of a plurality of commodities such as "the case in which a considerer travel overseas twice within a year" or "the case in which a considerer purchases two automobiles within one year", a simple recommendation including a combination of commodities ranked top or second to top in a degree-of-recommendation may not be appropriate.

For example, in case of overseas travel, a considerer may "wish to go to the same/similar place twice" or "wish to go to places of opposite types" according to liking or preference of the considerer. In case of an automobile, there can be a selection in which one is a small car for daily use that is capable of making a small turn in a narrow road and another is a large car that is incapable of making a small turn but can accommodate a lot of passengers or baggage.

Therefore, when a combination of a plurality of commodities is recommended, one of possible methods is a method of combining a function for calculating a degree of similarity, a degree of conflict or the like among respective selection candidates, and a function for calculating a relation between the selection candidates and an intention of a considerer. For example, a degree of conflict can be calculated by the following expression.

$$\text{Degree of conflict} = \frac{\sqrt{\sum_{k=1}^{N} (E_{jk} - E_{j'k})^2}}{N} \quad (7)$$

Here, $E_{jk}$ is an evaluation of a commodity $C_j$ for an evaluation item $I_k$, $E_{j'k}$ is an evaluation of a commodity $C_{j'}$ for the evaluation item $I_k$ and N is a total number of evaluation items. When it is assumed that $E_{jk}$ and $F_{j'k}$ take values from 0 to 1, a degree of similarity can be represented by an expression such as degree of similarity=1−degree of conflict.

For a considerer who desires commodities that are contrary to each other, then the degree-of-recommendation calculating portion 116 can calculate products of sums of total evaluations (i.e., degrees of recommendation) and degrees of conflict of both the commodities for an arbitrary combination of commodities, to recommend a few commodities with their product ranked higher.

A combination of a plurality of commodities may be a combination of commodities of different types (fields) other than commodities of the same type (field). Hereinbelow are some examples.

Asset management: A ratio of distributing current assets to lands, stocks, bonds, deposits or the like is recommended based on the considerer's lifestyle.

Car purchase plan: A best plan is recommended not only concerning an automobile itself but also concerning whether a considerer purchases a used car or a new car, whether payment is in cash or loan if the considerer purchases a car or whether the considerer rents a car instead, based on preference and a current asset condition of the considerer.

Health management: A plan that a considerer can effectively carry out without difficulty is recommended for a combination of meals, supplements and sports based on lifestyle, health conditions, preferences, economic conditions or the like.

These recommendations can be presented appropriately as in the case of commodities of the same type, by anticipating a function for calculating a relationship between respective selection candidates.

Evaluation items and evaluation data defined for each commodity type in advance are stored in the commodity database 144. The same evaluation items can be used to all commodity types instead of using different items for each commodity type.

For example, although an automobile, fashion, interior, and movies are generally regarded as commodities of quite different types, evaluation items concerning designs and colors can be used as common to these commodities. However, if an evaluation is performed on the premise of Equation (3), since weighting of evaluation items should be naturally different depending on commodity types, weighting coefficient for the commodities can be defined as shown in FIG. 21. If the evaluation items are set across the commodity types in this way, alter a considerer has considered several commodities, then the considerer can obtain a recommendation for a new commodity type by answering a relatively few numbers of additional questions.

Compared with the tact that a recommendation for a single commodity depends mainly on how a considerer evaluates attractiveness of the commodity, a recommendation of a combination of commodities of different types has a characteristic of being affected greatly by a sense of value on what the considerer attaches significance to in the considerer's life in general. Since the invention of the present application is for appropriately reflecting the sense of value such as what a considerer attaches significance to, it can be said that the invention is more advantageous and has a larger effect compared with the conventional method in the case in which a combination of commodities of different types is recommended.

If there are a plurality of considerers, then it is possible that a recommendation for all the considerers is performed in addition to performing recommendations for respective considerers. In this case, it would be possible in the simplest case that a calculating mean or a geometric mean of a degree-of-recommendation for each selection candidate calculated for respective considerers is calculated in the degree-of-recommendation calculating portion 116 and selection candidates are recommended in the order of the average degree-of-recommendation.

FIG. 22 shows an example of when a recommendation order of selection candidates is determined based on an average degree-of-recommendation found by calculating a calculating average of respective degrees of recommendations for a plurality of considerers A to D. Here, the degree-of-recommendation for each considerer shown in FIG. 22 is found by using numerical values of a evaluation for each evaluation item $\alpha$, $\beta$ and $\gamma$ of each selection candidate and a degree-of-significance for evaluation items of each considerer shown in FIG. 24 and using the function for calculating a degree-of-recommendation of the above-described Equation (2). For example, a degree-of-recommendation of a commodity I by a considerer A is found by the following expression. 2 (degree-of-significance of A for item $\alpha$)×10 (evaluation of 1 for item $\alpha$)+1 (degree-of-significance of A for item $\beta$)×3 (evaluation of 1 for item $\beta$)+1 (degree-of-significance of A for item $\gamma$)×10 (evaluation of 1 for item $\gamma$)=33 In this case, a result of a recommendation order obtained for commodities I to V is I>II>III>IV>V.

However, since all the considerers are not always concerned or interested in selecting a selection candidate in a field under consideration in the same degree, it is preferable that a degree-of-recommendation is weighted-averaged based on a degree of concern or interest in a field under consideration in the degree-of-recommendation calculating portion 116.

FIG. 23 shows an example of when a recommendation order of selection candidates is determined based on a weighted average degree-of-recommendation found by weighted-averaged degrees of recommendations based on degrees of concern or interest of the plurality of considerers A to D for the field. In this case, it is assumed that a ratio of concern or interest of the plurality of considerers for the field is 1:1:4:3. A ratio of concern or interest of each considerer can be determined pre-questions or the like. In this case, a result of a recommendation order obtained for commodities I to V is V>IV>III>II>I.

Moreover, in the present invention, a ratio of degrees of significance may be considered for evaluation items of each considerer. In this case, the ratio of degrees of significance is required to be adjusted to conform with a ratio of degrees of concern or interest of each considerer. In FIG. 23, a ratio of degrees of concern or interest of each considerer is A:B:C:D=1:1:4:3.

On the other hand, in FIG. 24, a sum of degrees of significance of each considerer for the evaluation items $\alpha$, $\beta$ and $\gamma$ is A:4 (2+1+1), B:4(1+1+2) C:8(1−6+1) and D:6(1+3+2) and a ratio is A:B:C:D=1:1:2:1.5. Since only about half of the degrees of concern or interest of C and D is reflected in this ratio of degrees of significance, sums of degrees of significance of C and D are doubled, respectively, to be adjusted as A:B:C:D=1:1:4:3. Therefore, in FIG. 24, a weighted degree-of-significance of each evaluation item for the entire considerers is calculated as follows.

Weighted degree-of-significance of evaluation item $\alpha$=2 (degree-of-significance of A for item $\alpha$)+1 (degree-of-significance of B for item $\alpha$)+1 (degree-of-significance of C for item $\alpha$)×2+1 (degree-of-significance of D for item a)×2=7

Similarly, it is calculated as weighted degree-of-significance of evaluation item $\beta$=20, and weighted degree-of-significance of evaluation item $\gamma$=9. In the degree-of-recommendation calculating portion 116, a total degree-of-recommendation is calculated as follows using these weighted degrees of significance.

Total degree-of-significance of commodity I=7 (weight of evaluation item $\alpha$)×10 (evaluation of I for evaluation item $\alpha$)+3 (weight of evaluation item $\beta$)×20 (evaluation of I for item $\beta$)+10 (weight of evaluation item $\gamma$)×9 (evaluation of I for item $\gamma$)=220

As a result, as shown in FIG. 24, a result of a recommendation order obtained for commodities I to V is III>V=IV>I>II. It is desirable to appropriately select a method to be employed out of the methods in FIGS. 22 to 24 in accordance with the character of the field and the allowable length of a processing time.

To conclude the above, the case in which a plurality of considerers consider selection of a plurality of commodities that are optimal to the entire considerers is possible as a most sophisticated form of utilizing the present invention.

More specifically, this is described as the case in which whole family members (as an example, it is assumed here that the family consists of four members, a father and a mother, one son and one daughter) are thinking of moving to a certain region and considering to purchase commodities such as a land, a house, a car and interiors in a relatively short period of time (for example, within three months) as a household. In such a case, a place to move to is often a concern for the father and the children in terms of commuting and going to school and is often a concern for the mother and the children in terms of daily shopping, a house and interiors are often concerns of the women and a car is often a concern for men.

Moreover, although the mother and the daughter are concerned about a house and interiors to the same degree, their concerns are different. The same is true for the father and the son who are concerned about a car in the same way. That is, each considerer not only has a different degree of concern for each field of consideration, but also has a different degree-of-significance for each evaluation item.

However, it is possible to perform an optimal recommendation by setting an appropriate function taking the differences into account. In addition, a question leading considerers to a recommendation with which they are not satisfied is presented to them in the retrial mode of the present invention. In such a use, the presentation is nothing but a presentation of a point of consideration on which the considerers should adjust views or compromise.

In the conventional art, it would be a general practice to narrow down combinations of options by superimposing conditions in the case in which a plurality of considerers consider optimal selection of a plurality of commodities for the entire considerers. However, it is not reasonable because an evaluation item that is extremely important for some of them is likely to be neglected by an opposition of one of them. Even if a method such as the linear programming is used to present a combination of commodities that maximizes a sum of an objective evaluation value, such as money, it is highly likely that a subjective evaluation item is made light of. In addition, even if a recommendation result itself can be presented, if considerers are dissatisfied with it, information on what are point of views of the considerers to be adjusted is not given.

Therefore, there has been no system for assisting consideration that recommends a combination of a plurality of commodities which is the most suitable for all of a plurality of considerers on a real time basis while relying on views of each of the plurality of considerers (without combining the views as a view of a group such as employing a view of a majority).

On the other hand, the present invention forms answers of each of the considerers, including subjective items such as preferences into numerical values by the above-described various kinds of function processing and, then, performs a recommendation for the entire considerers and repeats retrials as long as one or more considerers are dissatisfied with the recommendation while showing points to be adjusted to them.

Thus, the present invention can essentially contribute to decision making of a company, which is most important in the actual economy, that a plurality of considerers consider a selection of a plurality of commodities most suitable for the entire considerers.

As described above, according to the present invention, since a degree-of-significance of each evaluation item of a considerer in a field is taken into account and, then, a recommendation of selection candidates is performed, whereby a more appropriate recommendation close to the likings of the considerer can be performed.

The present invention is not limited to the above embodiments and various changes and modifications can be made within the spirit and scope of the present invention. Therefore, to apprise the public of the scope of the present invention the following claims are made.

What is claimed is:

1. A system for assisting consideration of selection that asks a considerer, who is considering at least one selection out of selection candidates in at least one field, questions concerning a field of consideration and assists decision making of the considerer by using answers to questions, said system comprising:
a storage device in which electronic data is storable and which has stored therein at least one piece of selection candidate data in the field of consideration, evaluation data for a plurality of evaluation items with respect to each piece of said selection candidate data, at least one piece of question data concerning the field of consideration, said questions being classified into at least one class of question, option data with respect to each piece of said question data, and points of degree-of-necessity for classes of question with respect to each piece of said option data;
a receiving unit for receiving at least one piece of option data as answer data of the considerer in response to said at least one question concerning the field of consideration, said receiving unit includes a question determining unit for receiving option data as said answer data in response to at least one question to the considerer, obtaining the points of degree-of-necessity for each class of question with respect to the option data as said answer data from the storage device, calculating a degree-of-necessity for each class of question from the obtained points of degree-of-necessity for each class of question and determining a subsequent question that belongs to the class whose calculated degree-of-necessity satisfies a certain fixed standard, wherein at least one degree-of-necessity is calculated by means of a function of points of degree-of-necessity with respect to said answer data in response to a plurality of questions;
a degree-of-significance estimating unit for estimating a degree-of-significance that the considerer attaches to each of the plurality of evaluation items in comparison to the other of said plurality of evaluation items in the field of consideration from said answer data of the considerer, wherein said degree-of-significance is estimated by a function of said answer data;
a degree-of-recommendation calculating unit for calculating a degree-of-recommendation representing to which degree each selection candidate is recommended to the considerer from evaluation data for each evaluation item with respect to each piece of selection candidate data in the field of consideration stored in said storage device, and said degree-of-significance of the considerer with respect to each evaluation item estimated by said degree-of-significance estimating unit; and
a presenting unit for presenting said degree-of-recommendation of each said selection candidate in said field of consideration,
wherein the selection candidate is ranked according to the degree-of-recommendation.

2. The system for assisting consideration of selection according to claim 1, wherein a degree-of-significance calculating function for calculating the degree-of-significance for each evaluation item from answer data of a considerer received by said receiving unit is stored in said storage device.

3. The system for assisting consideration of selection according to claim 1, wherein a degree-of-recommendation calculating function for calculating the degree-of-recommendation of each selection candidate from evaluation data and the degree-of-significance for each evaluation item with respect to each selection candidate data is stored in said storage device.

4. The system for assisting consideration of selection according to claim 1, further comprising:
a retrial processing unit for, when the considerer is dissatisfied with the degree-of-recommendation of selection candidates calculated by said degree-of-recommendation calculating unit and/or a result of a comparison thereof specifying causes of dissatisfaction, extracting questions due to the causes, receiving re-answer data for questions, and recalculating the degree-of-significance and the degree-of-recommendation based on said re-answer data.

5. The system for assisting consideration of selection according to claim 1, wherein said degree-of-significance estimating unit and said degree-of-recommendation calculating unit, respectively, calculate a degree-of-significance for each evaluation item and a degree-of-recommendation for each selection candidate each time answer data in response to each question is received by said receiving unit, and
wherein degrees of recommendation of all pieces of selection candidate data in a field of consideration are presented without change and/or after processing them each time answer data in response to each question is received by said receiving unit.

6. The system for assisting consideration of selection according to claim 1, wherein said degree-of-recommendation calculating unit calculates a degree-of-recommendation for each combination of a plurality of pieces of selection candidate data in one of a single field and a plurality of fields.

7. The system for assisting consideration of selection according to claim 1, wherein, when a plurality of considerers are performing consideration of selection of identical contents in a single or a plurality of fields, said degree-of-recommendation calculating unit calculates a degree-of-recommendation of all selection candidates for all of the considerers based on respective answers of each considerer.

8. The system for assisting consideration of selection according to claim 1, wherein a server provided with at least one of said storage device, receiving unit, degree-of-significance estimating unit and degree-of-recommendation calculating unit is connected with a terminal of said considerer by a communication line and wherein the considerer accesses the server, whereby a degree-of-recommendation of said all pieces of selection candidate data are presented to the considerer without change and/or alter processing.

9. The system for assisting consideration of selection according to claim 1, further comprising:
a medium for saving or storing answer data of a considerer in a reusable form.

10. The system for assisting consideration of selection according to claim 1, wherein the question determining unit obtains points of stored degree-of-necessity for each class of a question from the option data.

11. A computer-implemented method of assisting consideration of selection that asks a considerer, who is considering at least one selection out of selection candidates in at least one field, questions concerning a field of consideration and assists decision making of the considerer by using answers to questions, comprising:
storing electronic data including at least one piece of selection candidate data in the field of consideration, evaluation data for a plurality of evaluation items with respect to each piece of said selection candidate data, at least one piece of question data concerning the field of consideration, said questions being classified into at least one class of question, option data with respect to each piece of said question data, and points of a degree-of-necessity for classes of question with respect to each piece of said option data;
receiving answer data of the considerer in response to said at least one question concerning the field of consideration and receiving option data in response to the at least one question to the considerer, obtaining the points of degree-of-necessity for each class of a question from the option data, calculating a degree-of-necessity for each class of question from the obtained points of degree-of-necessity for each class of question and determining a subsequent question that belongs to the class whose calculated degree-of-necessity satisfies a certain fixed standard, wherein at least one degree-of-necessity is calculated by a function of points of degree-of-necessity with respect to said answer data in response to a plurality of questions;
instructing a processor to estimate a degree-of-significance that the considerer attaches to each of the plurality of evaluation items in comparison to the other of said plurality of evaluation items in the field of consideration from said answer data of the considerer, wherein said degree-of-significance is estimated by a function of said answer data;
instructing a processor to calculate a degree-of-recommendation representing to which degree each selection candidate is recommended to the considerer from evaluation data for each evaluation item with respect to each piece of selection candidate data in the field of consideration stored, and said degree-of-significance of the considerer with respect to each evaluation item estimated by said degree-of-significance estimating; and
presenting said degree-of-recommendation of each said selection candidate in said field of consideration,
wherein the selection candidate is ranked according to the degree-of-recommendation.

12. The computer-implemented method of assisting consideration of selection according to claim 11, further comprising:
when the considerer is dissatisfied with the calculated degree-of-recommendation of selection candidates and/or a result of a comparison thereof, specifying causes of dissatisfaction, extracting questions due to the causes, receiving re-answer data for questions, and recalculating a degree-of-significance and a degree-of-recommendation based on said re-answer data.

13. The computer-implemented method of assisting consideration of selection according to claim 11, wherein said estimating a degree-of-significance for each evaluation item and calculating a degree-of-recommendation for each selection candidate are performed each time answer data in response to each question is received, further comprising:
presenting degrees of recommendation of all pieces of selection candidate data in a field of consideration without change and/or after processing them each time answer data in response to each question is received.

14. The computer-implemented method of assisting consideration of selection according to claim 11, wherein said receiving includes receiving answer data in response to first at least one question of a considerer, further comprising:
determining whether to select a question suitable to the considerer as a subsequent question out of the at least one question stored and to receive answer data of the considerer in response to the question, or not to receive answer data from the considerer without selecting a subsequent question.

15. A machine-readable storage medium tangibly embodying a program of machine-readable instructions executable by a digital processing apparatus for assisting consideration of selection for causing a calculating unit that, in order to ask a considerer, who is considering at least one selection out of selection candidates in at least one field, questions concerning a field of consideration and assist decision making of the considerer by using answers to the questions, includes a storage device having stored therein at least one piece of selection candidate data in the field of consideration, evaluation data for a plurality of evaluation items with respect to each piece of selection candidate data, at least one piece of question data concerning the field of consideration, said questions being classified into at least one class of question, option data with respect to each piece of said question data, and points of a degree-of-necessity for classes of question with respect to each piece of said answer data to function as:

a receiving unit for receiving at least one piece of option data as answer data of the considerer in response to said at least one question concerning the field of consideration, said receiving unit includes a question determining unit for receiving option data as said answer data in response to at least one question to the considerer, obtaining the points of degree-of-necessity for each class of question with respect to the option data as said answer data from the storage device, calculating a degree-of-necessity for each class of question from the obtained points of degree-of-necessity for each class of question and determining a subsequent question that belongs to the class whose calculated degree-of-necessity satisfies a certain fixed standard, wherein at least one degree-of-necessity is calculated by a function of points of degree-of-necessity with respect to said answer data in response to a plurality of questions;

a degree-of-significance estimating unit for estimating a degree-of-significance that the considerer attaches to each of the plurality of evaluation items in comparison to the other of said plurality of evaluation items in the field of consideration from said answer data of the considerer, wherein said degree-of-significance is estimated by a function of said answer data;

a degree-of-recommendation calculating unit for calculating a degree-of-recommendation representing to which degree each selection candidate is recommended to the considerer from evaluation data for each evaluation item with respect to each piece of selection candidate data in the field of consideration stored in said storage device, and said degree-of-significance of the considerer with respect to each evaluation item estimated by said degree-of-significance estimating unit; and a presenting unit for presenting said degree-of-recommendation of each said selection candidate in said field of consideration, wherein the selection candidate is ranked according to the degree-of-recommendation.

16. The storage medium according to claim 15 for causing a calculating unit to further function as:

a retrial processing unit for, when the considerer is dissatisfied with the degree-of-recommendation of selection candidates calculated by said degree-of-recommendation calculating unit and/or a result of a comparison thereof, specifying causes of dissatisfaction, extracting questions due to the causes, receiving re-answer data for questions, and recalculating a degree-of-significance and a degree-of-recommendation based on said re-answer data.

17. The storage medium according to claim 15, wherein said degree-of-significance estimating unit and said degree-of-recommendation calculating unit, respectively, calculate a degree-of-significance for each evaluation item and a degree-of-recommendation for each selection candidate each time answer data in response to each question is received by said receiving unit, and wherein degrees of recommendation of all pieces of selection candidate data in a field of consideration are presented without change and/or after processing them each time answer data in response to each question is received by said receiving unit.

* * * * *